US012212068B2

(12) United States Patent
Park et al.

(10) Patent No.: US 12,212,068 B2
(45) Date of Patent: Jan. 28, 2025

(54) ELECTRONIC DEVICE INCLUDING ANTENNA MODULE

(71) Applicant: Samsung Electronics Co., Ltd., Gyeonggi-do (KR)

(72) Inventors: Daehee Park, Gyeonggi-do (KR); Jungmin Park, Gyeonggi-do (KR); Janghoon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 97 days.

(21) Appl. No.: 17/892,826

(22) Filed: Aug. 22, 2022

(65) Prior Publication Data

US 2023/0047210 A1 Feb. 16, 2023

Related U.S. Application Data

(63) Continuation of application No. PCT/KR2021/018255, filed on Dec. 3, 2021.

(30) Foreign Application Priority Data

Dec. 3, 2020 (KR) ........................ 10-2020-0167764

(51) Int. Cl.

*H01Q 21/08* (2006.01)
*H01Q 1/24* (2006.01)
*H01Q 9/04* (2006.01)

(52) U.S. Cl.

CPC ............. *H01Q 21/08* (2013.01); *H01Q 1/243* (2013.01); *H01Q 9/045* (2013.01)

(58) Field of Classification Search

None

See application file for complete search history.

(56) References Cited

U.S. PATENT DOCUMENTS 10,455,065 B2 10/2019 Lee et al.
10,868,362 B2 12/2020 Yun et al.

(Continued)

FOREIGN PATENT DOCUMENTS

JP 2020-507230 3/2020
KR 10-2019-0013382 2/2019

(Continued)

OTHER PUBLICATIONS

PCT/ISA/210 Search Report issued on PCT/KR2021/018255, Mar. 30, 2022, pp. 5.

(Continued)

*Primary Examiner* — Jany Richardson

(74) *Attorney, Agent, or Firm* — The Farrell Law Firm, P.C.

(57) ABSTRACT

Disclosed is an electronic device including an antenna module comprising a first array antenna disposed on a first surface, a radio frequency integrated circuit (RFIC) disposed on a second surface which is parallel to the first surface, and a connector, a wireless communication circuit electrically connected with the antenna module through the connector, and a flexible printed circuit board (FPCB) electrically (Continued)

connected with the antenna module through the connector, the FPCB comprising a second array antenna, wherein the wireless communication circuit is configured to transmit and receive a first signal via the first array antenna, and to transmit and receive a second signal which is distinct from the first signal via the second array antenna.

19 Claims, 23 Drawing Sheets

(56) References Cited

U.S. PATENT DOCUMENTS

| | | | | |
|---|---|---|---|---|
| 11,011,828 | B2 | 5/2021 | Park et al. | |
| 11,089,677 | B2 | 8/2021 | Ryu et al. | |
| 11,183,753 | B2 | 11/2021 | Hong | |
| 11,417,954 | B2 | 8/2022 | Kim et al. | |
| 2002/0122006 | A1 | 9/2002 | Crawford | |
| 2020/0021015 | A1 | 1/2020 | Yun et al. | |
| 2020/0091608 | A1 | 3/2020 | Alpman et al. | |
| 2020/0161763 | A1 | 5/2020 | Lee et al. | |
| 2020/0303806 | A1 | 9/2020 | Wu et al. | |
| 2021/0007213 | A1 | 1/2021 | Ryu et al. | |
| 2021/0143525 | A1* | 5/2021 | Kim | H01Q 9/0407 |
| 2021/0235576 | A1* | 7/2021 | Nagai | H05K 1/0237 |
| 2021/0280964 | A1 | 9/2021 | Hong | |
| 2021/0305694 | A1 | 9/2021 | Kim et al. | |
| 2021/0320414 | A1* | 10/2021 | Kim | H01Q 25/005 |
| 2022/0158361 | A1 | 5/2022 | Kim et al. | |

FOREIGN PATENT DOCUMENTS

| | | |
|---|---|---|
| KR | 1020190119954 | 10/2019 |
| KR | 10-2020-0007377 | 1/2020 |
| KR | 10-2020-0014601 | 2/2020 |
| KR | 1020200058153 | 5/2020 |
| KR | 1020200082417 | 7/2020 |
| KR | 1020200092122 | 8/2020 |
| KR | 1020200113410 | 10/2020 |
| KR | 10-2020-0131159 | 11/2020 |
| WO | WO 2019/198870 | 10/2019 |
| WO | WO 2020/045963 | 3/2020 |
| WO | WO 2020/153823 | 7/2020 |

OTHER PUBLICATIONS

PCT/ISA/237 Written Opinion issued on PCT/KR2021/018255, Mar. 30, 2022, pp. 4.

European Search Report dated Feb. 1, 2024 issued in counterpart application No. 21901080.8-1205, 10 pages.

Korean Office Action dated Nov. 27, 2024 Issued in counterpart application No. 10-2020-0167764, 13 pages.

* cited by examiner

ELECTRONIC DEVICE INCLUDING ANTENNA MODULE

CROSS-REFERENCE TO RELATED APPLICATION(S)

This application is a Bypass Continuation Application of International Application No. PCT/KR2021/018255, which was filed on Dec. 3, 2021, and is based on and claims priority under 35 U.S.C. § 119 to Korean Patent Application No. 10-2020-0167764, which was filed in the Korean Intellectual Property Office on Dec. 3, 2020, the entire disclosure of each of which is incorporated herein by reference.

BACKGROUND

1. Field

The disclosure relates generally to an electronic device, and more particularly, to an electronic device including an antenna module.

2. Description of Related Art

Efforts to commercialize next-generation (i.e., $5^{th}$ generation (5G) or pre-5G) communication systems have been ongoing in order to meet the increasing demand for wireless data traffic since $4^{th}$ generation (4G) communication systems were commercialized.

Thus, a next-generation communication system may be implemented in a high-frequency band to achieve a high data transfer rate. In order to mitigate high free space loss in a high frequency band and to increase a transmission distance of radio waves in the next-generation communication system, techniques for beamforming, massive multiple input multiple output (MIMO), full dimensional MIMO (FD-MIMO), array antenna, analog beam-forming, or large scale antenna are being discussed.

In addition, as the demand for a communication system utilizing signals of various frequency bands increases, techniques for effectively controlling a plurality of antenna modules are being discussed.

When a plurality of radio frequency integrated circuits (RFICs) and a plurality of flexible printed circuit boards (FPCBs) are employed to operate a plurality of antenna modules, production processes and cost may increase in proportion to the number of antenna modules.

In addition, when a plurality of antenna modules is connected through an FPCB and are operated, there tends to be a limit to positions where the plurality of antenna modules are disposed in an electronic device.

Accordingly, there is a need in the art for an electronic device by which a high degree of freedom of mounting can be ensured by operating a module based on a single RFIC and a single FPCB.

SUMMARY

The disclosure has been made to address at least the above-mentioned problems and/or disadvantages and to provide at least the advantages described below.

Accordingly, an aspect of the disclosure is to provide a method and apparatus by which a plurality of array antennas is operated based on a single module, thereby streamlining a production process and reducing production costs.

Another aspect of the disclosure is to provide a method and apparatus by which a high degree of freedom in arrangements of antennas for radiating various signals can be ensured by utilizing an antenna module based on a single module and an FPCB.

In accordance with an aspect of the disclosure, an electronic device includes an antenna module comprising a first array antenna disposed on a first surface, a radio frequency integrated circuit (RFIC) disposed on a second surface which is parallel to the first surface, and a connector, a wireless communication circuit electrically connected with the antenna module through the connector, and a flexible printed circuit board (FPCB) electrically connected with the antenna module through the connector, the FPCB comprising a second array antenna, wherein the wireless communication circuit is configured to transmit and receive a first signal via the first array antenna, and to transmit and receive a second signal which is distinct from the first signal via the second array antenna.

In accordance with another aspect of the disclosure, an antenna module includes a first array antenna disposed on a first surface, a connector disposed on a second surface which is parallel to the first surface, and an RFIC electrically connected with the connector and the first array antenna, wherein the RFIC is configured to modulate an IF signal received from the connector into an RF signal, and to transmit the RF signal to the first array antenna and the connector.

In accordance with another aspect of the disclosure, an electronic device includes an antenna module comprising a first array antenna, an RFIC, a first connector and a second connector, a wireless communication circuit electrically connected with the antenna module through the first connector, and an FPCB electrically connected with the antenna module through the second connector, the FPCB comprising a second array antenna, wherein the wireless communication circuit is configured to transmit and receive a first signal via the first array antenna, and to transmit and receive a second signal which is distinct from the first signal via the second array antenna.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
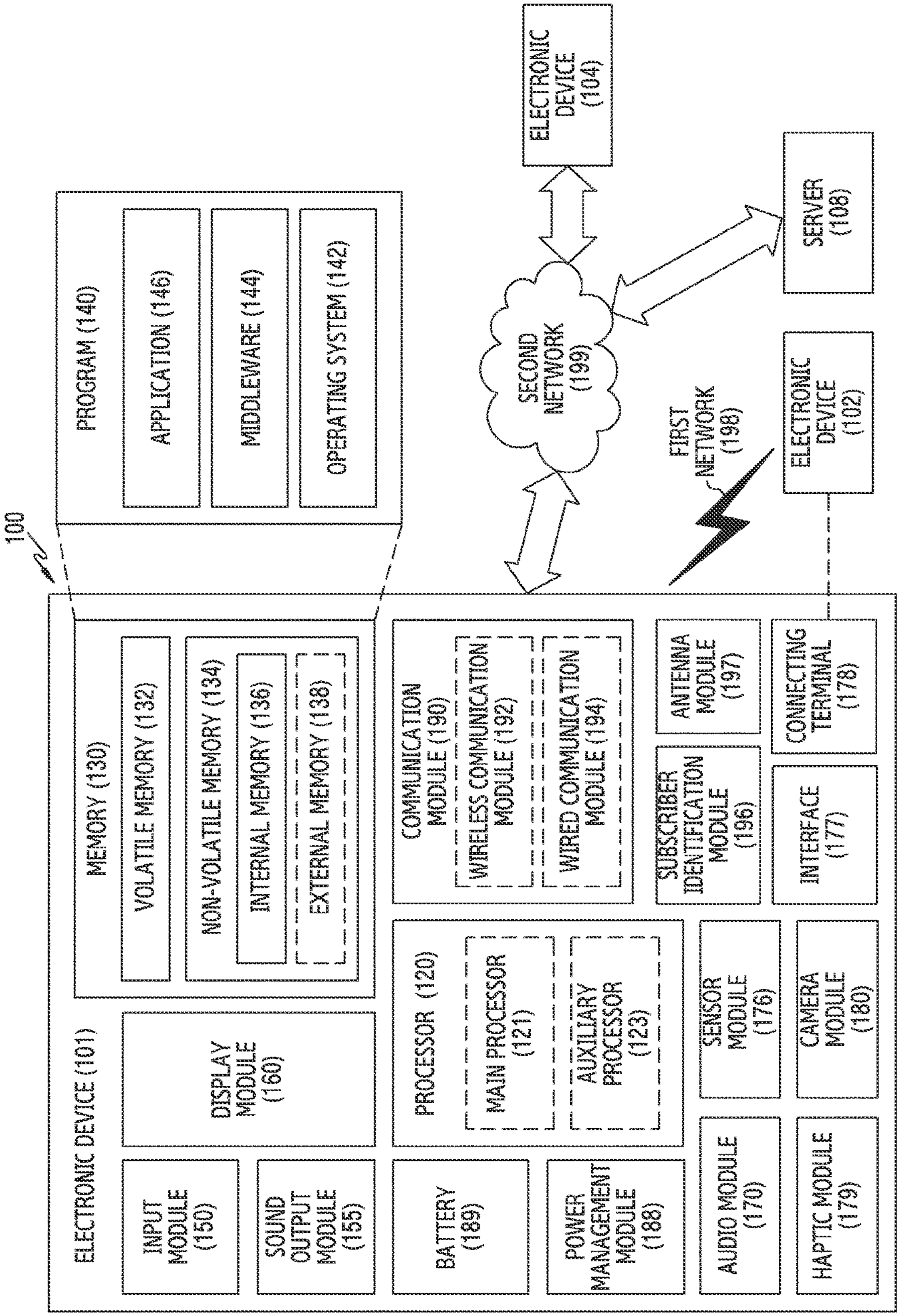
FIG. 1 is a block diagram of an electronic device in a network environment according to an embodiment.

Hereinafter, embodiments of this document will be described with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

The electronic device herein may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another and do not limit the components in importance or order. It is to be understood that if an element (e.g., a first element) is referred to, with or without the term "operatively" or "communicatively", as "coupled with," "coupled to," "connected with," or "connected to" another element (e.g., a second element), this indicates that the first element may be coupled with the second element directly (e.g., wiredly), wirelessly, or via a third element.

FIG. 1 illustrates an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) card 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute a program 140 to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. The auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include the program 140 and input data or output data for a command related thereto. The memory 130 may include the volatile memory 132 or the non-volatile memory 134.

The program 140 may be stored in the memory 130 as software and may include an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include a microphone, a mouse, a keyboard, a key (e.g., a button), or a digital pen (e.g., a stylus pen).

The sound output module 155 may output sound signals to the outside of the electronic device 101. The sound output module 155 may include a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150 or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state.

The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. According to one embodiment, the power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device 104, or a second network 199. The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas (e.g., array antennas). In such a case, at least one antenna appropriate for a communication scheme used in the communication network, such as the first network 198 or the second network 199, may be selected by the wireless communication module 192 from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

The antenna module 197 may form an mmWave antenna module. The mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud, distributed, mobile edge (MEC), or client-server computing technology may be used.

The electronic device 101 may provide ultra-low-latency services using, e.g., distributed computing or mobile edge computing. In an embodiment, the external electronic device 104 may include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
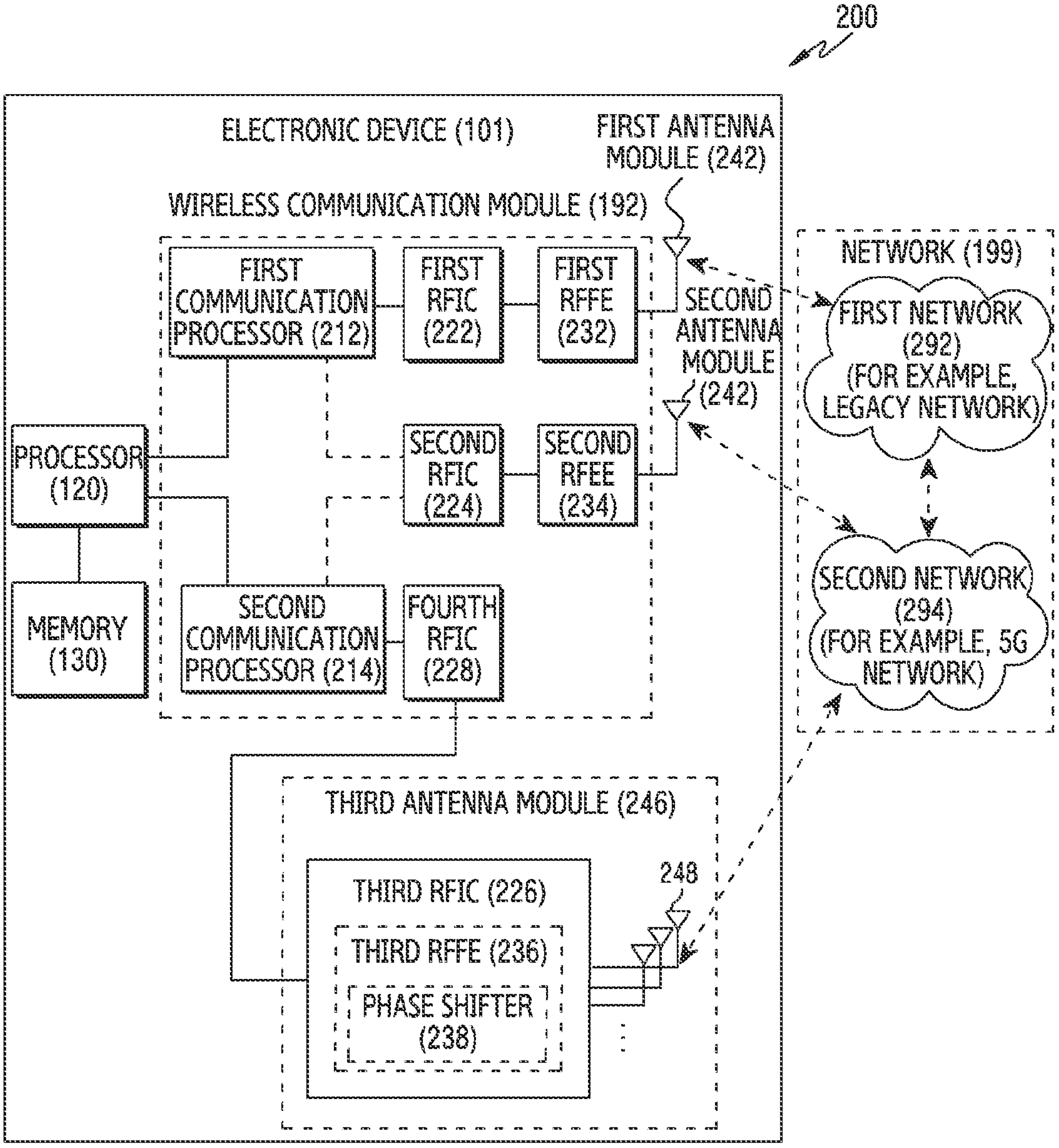
FIG. 2 is a block diagram of an electronic device for supporting legacy network communication and 5G network communication according to an embodiment.

FIG. 2 is a block diagram 200 of an electronic device 101 for supporting legacy network communication and 5G network communication according to an embodiment. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. The electronic device 101 may further include at least one of the components illustrated in FIG. 1, and the network 199 may further include at least one other network. The first communication processor 212, the second communication processor 214, the first RFIC 222, the second RFIC 224, the fourth RFIC 228, the first RFFE 232, and the second RFFE 234 may form at least part of a wireless communication module 192. The fourth RFIC 228 may be omitted or may be included as part of the third RFIC 226.

The first communication processor 212 may support establishing a communication channel of a band to be used for wireless communication with the first network 292 and may support legacy network communication via the established communication channel. The first network may be a legacy network including a second generation (2G), 3G, 4G, or long-term evolution (LTE) network. The second communication processor 214 may support establishing a communication channel corresponding to a designated band (for example, about 6 gigahertz (GHz) to about 60 GHz) among bands to be used for wireless communication with the second network 294 and may support 5G network communication via the established communication channel. The second network 294 may be a 5G network which is defined in 3GPP. The first communication processor 212 or the second communication processor 624 may support establishing a communication channel corresponding to another designated band (for example, about 6 GHz or less) among the bands to be used for wireless communication with the second network 294, and may support 5G network communication via the established communication channel. The first communication processor 212 and the second communication processor 214 may be implemented within a single chip or a single package. The first communication processor 212 or the second communication processor 214 may be formed within the single chip or the single package, with the processor 120, the auxiliary processor 123, or the communication module 190.

When transmitting signals, the first RFIC 222 may convert a baseband signal, which is generated by the first communication processor 212, into an RF signal of about 700 MHz to about 3 GHz to be used in the first network 292 (for example, a legacy network). When signals are received, an RF signal may be acquired from the first network 292 (for example, the legacy network) via the first antenna module 242, and may be pre-processed through the first RFFE 232. The first RFIC 222 may convert the pre-processed RF signal into a baseband signal to be processed by the first communication processor 212.

When transmitting signals, the second RFIC 224 may convert a baseband signal, which is generated by the first communication processor 212 or the second communication processor 214, into a 5G Sub6 RF signal of a Sub6 band (for example, about 6 GHz or less) to be used in the second network 294 (for example, a 5G network). When signals are received, a 5G Sub6 RF signal may be acquired from the second network 294 (for example, the 5G network) via an antenna (for example, the second antenna module 244), and may be pre-processed through the second RFFE 234. The second RFIC 224 may convert the pre-processed 5G Sub6 RF signal into a baseband signal to be processed by a corresponding communication processor among the first communication processor 212 or the second communication processor 214.

When transmitting signals, the third RFIC 226 may convert a baseband signal, which is generated by the second communication processor 214, into an RF signal (hereinafter, a 5G Above6 RF signal) of a 5G Above6 band (for example, about 6 GHz to about 60 GHz) to be used in the second network 294 (for example, the 5G network). When signals are received, a 5G Above6 RF signal may be acquired from the second network 294 via an antenna (for example, the antenna elements 248), and may be pre-processed through the third RFFE 236. The third RFIC 226 may convert the pre-processed 5G Above6 RF signal into a baseband signal to be processed by the second communication processor 214. The third RFFE 236 may be formed as part of the third RFIC 226.

The electronic device 101 may include the fourth RFIC 228 as separate from or as part of the third RFIC 226. In this case, the fourth RFIC 228 may convert a baseband signal, which is generated by the second communication processor 214, into an RF signal of an IF band (for example, about 9 GHz to about 11 GHz) (hereinafter, an IF signal), and then may transfer the IF signal to the third RFIC 226. The third RFIC 226 may convert the IF signal into a 5G Above6 RF signal. When signals are received, a 5G Above6 RF signal may be received from the second network 294 via an antenna (for example, the antenna 248), and may be converted into an IF signal by the third RFIC 226. The fourth RFIC 228 may convert the IF signal into a baseband signal to be processed by the second communication processor 214.

The first RFIC 222 and the second RFIC 224 may be implemented as part of a single chip or single package. The first RFFE 232 and the second RFFE 234 may be implemented as part of a single chip or a single package. At least one antenna module of the first antenna module 242 or the second antenna module 244 may be omitted or may be coupled with another antenna module to process RF signals of a plurality of corresponding frequency bands.

The third RFIC 226 and the antenna 248 may be disposed on the same substrate to form a third antenna module 246. For example, the wireless communication module 19 or the processor 120 may be disposed on a main PCB. In this case, the third antenna module 246 may be formed by the third RFIC 226 being disposed on a lower surface of a sub PCB separate from the main PCB, and the antenna 248 being disposed on an upper surface. The third RFIC 226 and the antenna 248 may be disposed on the same substrate, so that a length of a transmission line therebetween can be reduced. This can also reduce loss (i.e., attenuation) of a signal of a high frequency band of about 6 GHz to about 60 GHz used for 5G network communication, which is caused by a transmission line. Accordingly, the electronic device 101 can enhance quality or speed of communication with the second network 294.

The antenna 248 may be formed as an antenna array including a plurality of antenna elements to be used for beamforming. In this case, the third RFIC 226 may include a plurality of phase shifters 238 corresponding to the plurality of antenna elements, as part of the third RFFE 236. When transmitting signals, the plurality of phase shifters 238 may shift phases of 5G Above6 RF signals to be transmitted to the outside (for example, a base station of the 5G network) of the electronic device 101 via corresponding antenna elements. When receiving signals, the plurality of phase shifters 238 may shift phases of 5G Above6 RF signals received from the outside through corresponding antenna elements to the same phases or substantially the same phases. This enables transmission or reception through beamforming between the electronic device 110 and the outside.

The second network 294 may be operated independently from the first network 292 (for example, stand-alone (SA)), or may be operated in conjunction therewith (for example, non-stand alone (NSA)). For example, the 5G network may include a 5G radio access network (RAN or a next generation RAN (NG RAN)), and may not include a next generation core (NGC). In this case, after accessing the access network of the 5G network, the electronic device 101 may access the Internet under control of the core network (for example, an evolved packed core (EPC)) of the legacy network. LTE protocol information for communication with the legacy network or (NR) protocol information for communication with the 5G network may be stored in the memory 130, and may be accessed by the processor 120, the first communication processor 212, or the second communication processor 214.

Figure 3B:
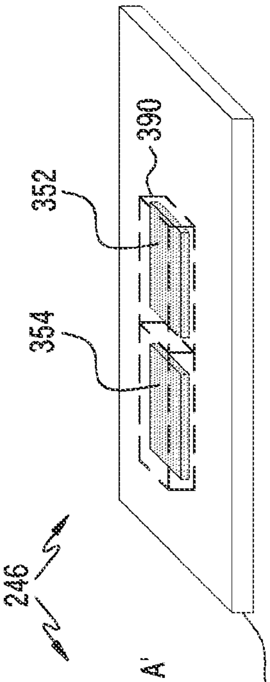
FIG. 3B is a perspective view of the third antenna module when viewed from the other side.
Figure 3A:
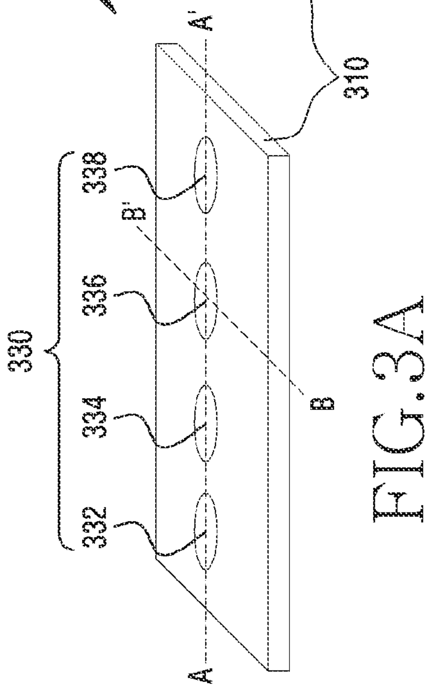
FIG. 3A is a perspective view of a third antenna module when viewed from one side.
Figure 3C:
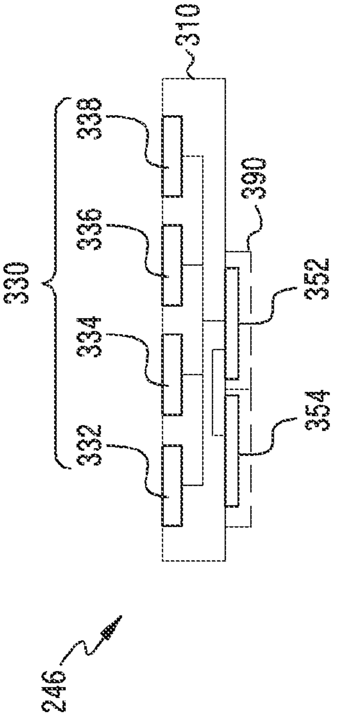
FIG. 3C is a cross-sectional view of the third antenna module, taken on line A-A'.

FIG. 3A is a perspective view of the third antenna module 246 when viewed from one side, and FIG. 3B is a perspective view of the third antenna module 246 when viewed from the other side. FIG. 3C is a cross-sectional view of the third antenna module 246, taken on line A-A'.

Referring to FIG. 3A, FIG. 3B and FIG. 3C, the third antenna module 246 may include a PCB 310, an array antenna 330, an RFIC 352, a PMIC 354, a module interface.

The third antenna module 246 may further include a shielding member 390. At least one of the above-mentioned components may be omitted or at least two of the components may be integrally formed.

The PCB 310 may include a plurality of conductive layers, and a plurality of nonconductive layers which are stacked alternately with the conductive layers. The PCB 310 may provide an electric connection between various electronic components arranged on the PCB 310 and/or an outside by using wires and conductive vias which are formed on the conductive layers.

The array antenna 330 may include a plurality of antenna elements 332, 334, 336, or 338 arranged to form a directional beam. The antenna elements may be formed on a first surface of the PCB 310 as shown in the drawing. Alternatively, the array antenna 330 may be formed inside the PCB 310. The array antenna 330 may include a plurality of array antennas of the same or different shapes or types (for example, dipole array antennas and/or patch array antennas).

The RFIC 352 may be disposed on another area (for example, a second surface opposite to the first surface) of the PCB 310, spaced apart from the array antenna. The RFIC may be configured to process a signal of a selected frequency band, which is transmitted/received through the array antenna 330. According to an embodiment, when transmitting signals, the RFIC 352 may convert a baseband signal acquired from a CP into an RF signal of a designated band. When receiving signals, the RFIC 352 may convert an RF signal received via the array antenna 330 into a baseband signal, and may transmit the baseband signal to the CP.

According to an embodiment, when transmitting signals, the RFIC 352 may up-convert an IF signal (for example, about 9 GHz to about 11 GHz) acquired from an intermediate frequency integrated circuit (IFIC) 228 into an RF signal of a selected band. When receiving signals, the RFIC 352 may down-convert an RF signal acquired via the array antenna 330 into an IF signal and may transmit the IF signal to the IFIC.

The PMIC 354 may be disposed on the second surface of the PCB 310, which is spaced apart from the array antenna. The PMIC may receive a voltage from a main PCB, and may provide necessary power to various components on the antenna module.

The shielding member 390 may be disposed on the second surface of the PCB 310 to electromagnetically shield at least one of the RFIC 352 or the PMIC 354. The shielding member 390 may include a shield can.

The third antenna module 246 may be electrically connected with a main circuit board through a module interface. The module interface may include a connection member, such as a coaxial cable connector, a board-to-board connector, an interposer, or an FPCB. The RFIC 352 and/or the PMIC 354 of the antenna module may be electrically connected with the PCB through the connection member.

Figure 4A:
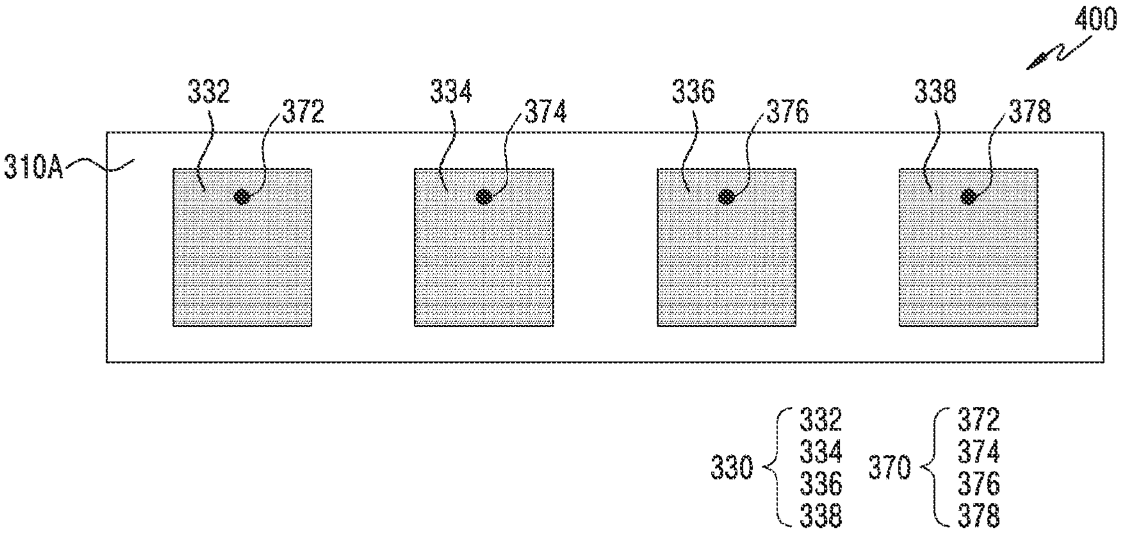
FIG. 4A illustrates a front view of an antenna module according to an embodiment.
Figure 4B:
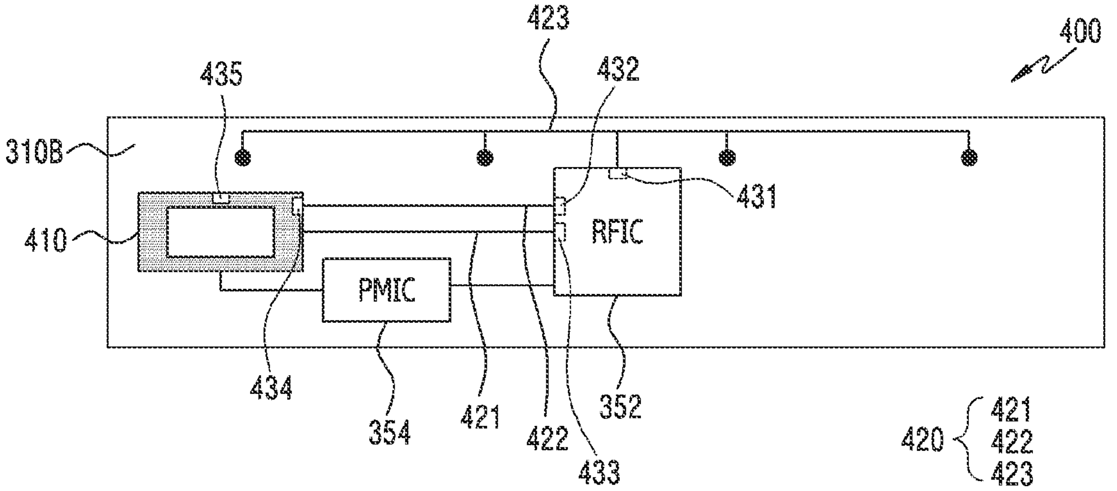
FIG. 4B illustrates a rear view of the antenna module of FIG. 4A.

FIG. 4A illustrates a front view of an antenna module according to an embodiment. FIG. 4B illustrates a rear view of the antenna module of FIG. 4A.

Referring to FIG. 4A, the antenna module 400 may include the PCB 310 and a first array antenna 330 disposed on a first surface 310A of the PCB. The first array antenna 330 may include a first antenna element 332, a second antenna element 334, a third antenna element 336, and a fourth antenna element 338. Some of the above-described elements may be omitted or some configuration may be added. The first array antenna 330 may include a plurality of patch antenna arrangements (for example, the first antenna element 332, the second antenna element 334, the third antenna element 336, the fourth antenna element 338).

The plurality of patch antenna arrangements may include feeding units 372, 374, 376, and 378, respectively. The plurality of patch antenna arrangements may be fed through the plurality of feeding units 370. Alternatively, the first antenna element 332 may include a plurality of feeding units therein. For example, the second antenna element 334 may include two feeding units, and the third antenna element 336 may include one feeding unit, such that the second antenna element 334 and the third antenna element 336 have different polarization characteristics.

Referring to FIG. 4B, the antenna module 400 may include an RFIC 352, a PMIC 354, a connector 410, and a transmission line 420 disposed on a second surface 310B which is parallel to the first surface 310A. A configuration which is substantially the same as the above-described configuration may use the same reference numeral, and a redundant explanation thereof is omitted.

Referring to FIGS. 4A and 4B, the RFIC 352 may be electrically connected with the connector 410, the PMIC 354, and the first array antenna 330. The RFIC 352 may be connected with the connector 410 through a first transmission line 421 and a second transmission line 422. For example, the RFIC 352 may receive an IF signal from the connector 410 via the first transmission line 421.

The RFIC 352 may modulate the first signal received from the connector 410 into a second signal (for example, an RF signal) and/or a third signal.

The RFIC 352 may transmit the second signal to the connector 410 via the second transmission line 422. For example, the RFIC 352 may provide the second signal to an FPCB by transmitting the second signal to the connector 410. The RFIC 352 may transmit the third signal to the first array antenna 330 via a third transmission line 423. For example, the second signal and the third signal may be signals of substantially the same frequency band but are not limited thereto.

The RFIC 352 may be electrically connected with a wireless communication circuit and an FPCB through the connector 410. For example, the wireless communication circuit may transmit and/or receive a signal of a designated frequency band (for example, about 28 GHz) through the first array antenna 330, by controlling the RFIC 352 to transmit the third signal to the first array antenna 330. The wireless communication circuit may transmit and receive a signal of a designated frequency band through a second array antenna disposed on an FPCB, by controlling the RFIC 352 to transmit the second signal.

The RFIC 352 may include a plurality of terminal groups. The RFIC 352 may include a reception terminal 433, a first terminal group 431, and a second terminal group 432. The RFIC 352 may include the reception terminal 433 for receiving the first signal. The RFIC 352 may include the first terminal group 431 connected with the third transmission line 423. The RFIC 352 may include the second terminal group 432 connected with the second transmission line 422.

Each of the plurality of terminal groups included in the RFIC 352 may include a plurality of terminals. The first terminal group 431 may include a plurality of terminals. For example, when the first array antenna 330 includes an even number of elements, the first group terminal 431 may include an even number of terminals (for example, 8 terminals). In another example, when some of horizontally or vertically polarized waves are transmitted through the first terminal group 431, the first terminal group 431 may include an odd number of terminals, but the number of terminals of the first terminal group 431 is not limited to the above-described example.

The second group terminal 432 may include a plurality of terminals. For example, when the second array antenna includes an even number of elements, the second group terminal 432 may include an even number of terminals (for example, 4 terminals). In another example, when some of horizontally or vertically polarized waves are transmitted through the second terminal group 432, the second terminal group 432 may include an odd number of terminals, but the number of terminals of the second terminal group 432 is not limited to the above-described examples.

The connector 410 may include a plurality of terminal groups. The connector 410 may include a third terminal group 434 corresponding to the second terminal group 432 of the RFIC 352 and a fourth terminal group 434 connected with an FPCB.

Figure 5A:
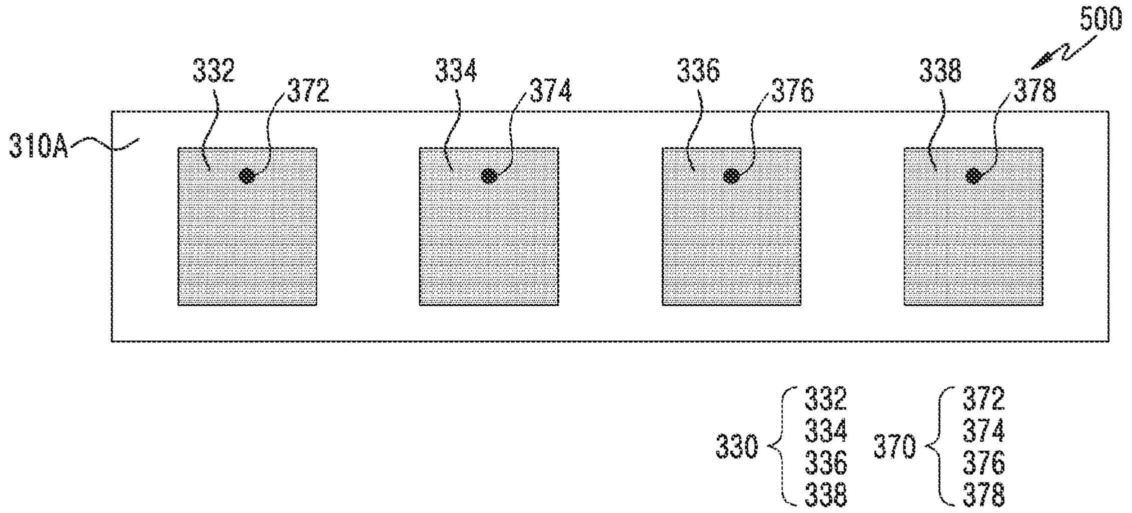
FIG. 5A illustrates a front view of an antenna module according to an embodiment.
Figure 5B:
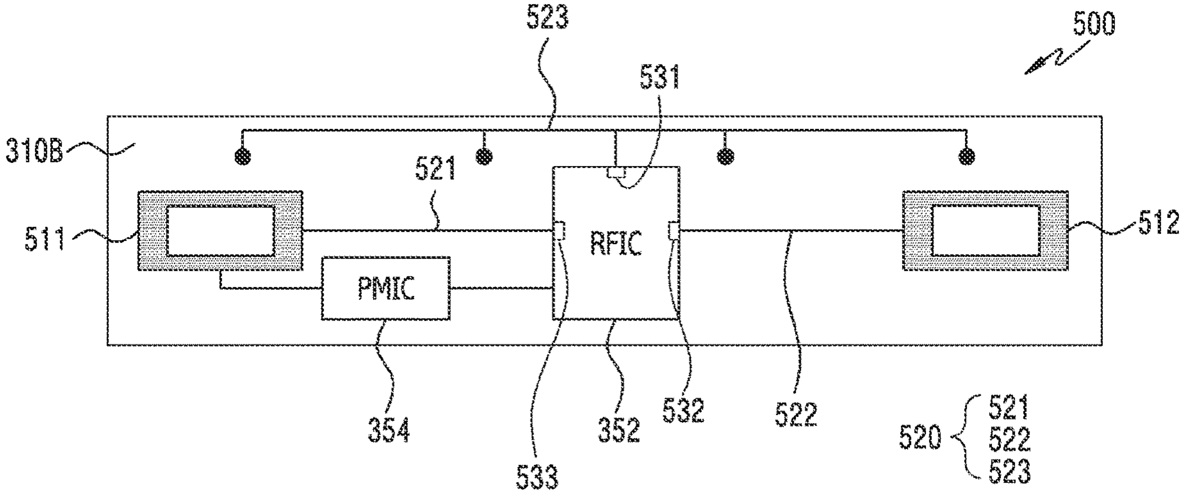
FIG. 5B illustrates a rear view of the antenna module of FIG. 5A.

FIG. 5A illustrates a front view of an antenna module according to an embodiment. FIG. 5B illustrates a rear view of the antenna module of FIG. 5A.

Referring to FIG. 5A, the antenna module 500 may include the PCB 310 and a first array antenna 330 disposed on a first surface 310A of the PCB. Referring to FIG. 5B, the antenna module 500 may include an RFIC 352, a PMIC 354, a first connector 511, a second connector 512, and a transmission line 520 disposed on a second surface 310B which is parallel to the first surface 310A. A configuration which is substantially the same as the above-described configuration uses the same reference numeral, and a redundant explanation thereof is omitted.

Referring to FIGS. 5A and 5B, the RFIC 352 may be electrically connected with the first connector 511, the second connector 512, the PMIC 354, and the array antenna 330. The RFIC 352 may be connected with the first connector 511 through a first transmission line 521. For example, the RFIC 352 may receive a first signal (for example, an IF signal) from the first connector 511 via the first transmission line 521.

The RFIC 352 may modulate the first signal received from the first connector 511 into an RF) signal and/or a third signal. The RFIC 352 may be connected with the second connector 512 through a second transmission line 522. The RFIC 352 may transmit the second signal to the second connector 512 via the second transmission line 522.

The RFIC 352 may transmit the third signal to the first array antenna 330 via a third transmission line 523. For example, the RFIC 352 may transmit and receive a signal of a designated frequency band (for example, about 28 GHz) by transmitting an RF signal to the first array antenna 330. The second signal and the third signal may be of substantially the same frequency band but are not limited thereto.

The RFIC 352 may include a reception terminal 533 for receiving the first signal. The RFIC 352 may include a first terminal group 531 connected with the third transmission line 523. The RFIC 352 may include a second terminal group 532 connected with the second transmission line 522. For example, each of the first terminal group 531 and the second terminal group 532 may include an even number of terminals (for example, 8 terminals), but is not limited thereto.

The RFIC 352 may be electrically connected with a wireless communication circuit through the first connector 511. The RFIC 352 may be electrically connected with an FPCB through the second connector 512. For example, the wireless communication circuit may transmit and/or receive a signal of a designated frequency band (for example, about 28 GHz) via the first array antenna 330, by controlling the RFIC 352 to transmit the third signal to the first array antenna 330. The wireless communication circuit may transmit and receive a signal of a designated frequency band via a second array antenna disposed on an FPCB, by controlling the RFIC 352 to transmit the second signal.

Alternatively, the PMIC 354 may be electrically connected with the second connector 512. The PMIC 354 may be electrically connected with the second connector 512 through the RFIC 352. For example, the PMIC 354 may supply power to the FPCB through the second connector 512 by being electrically connected with the second connector 512.

Figure 6A:
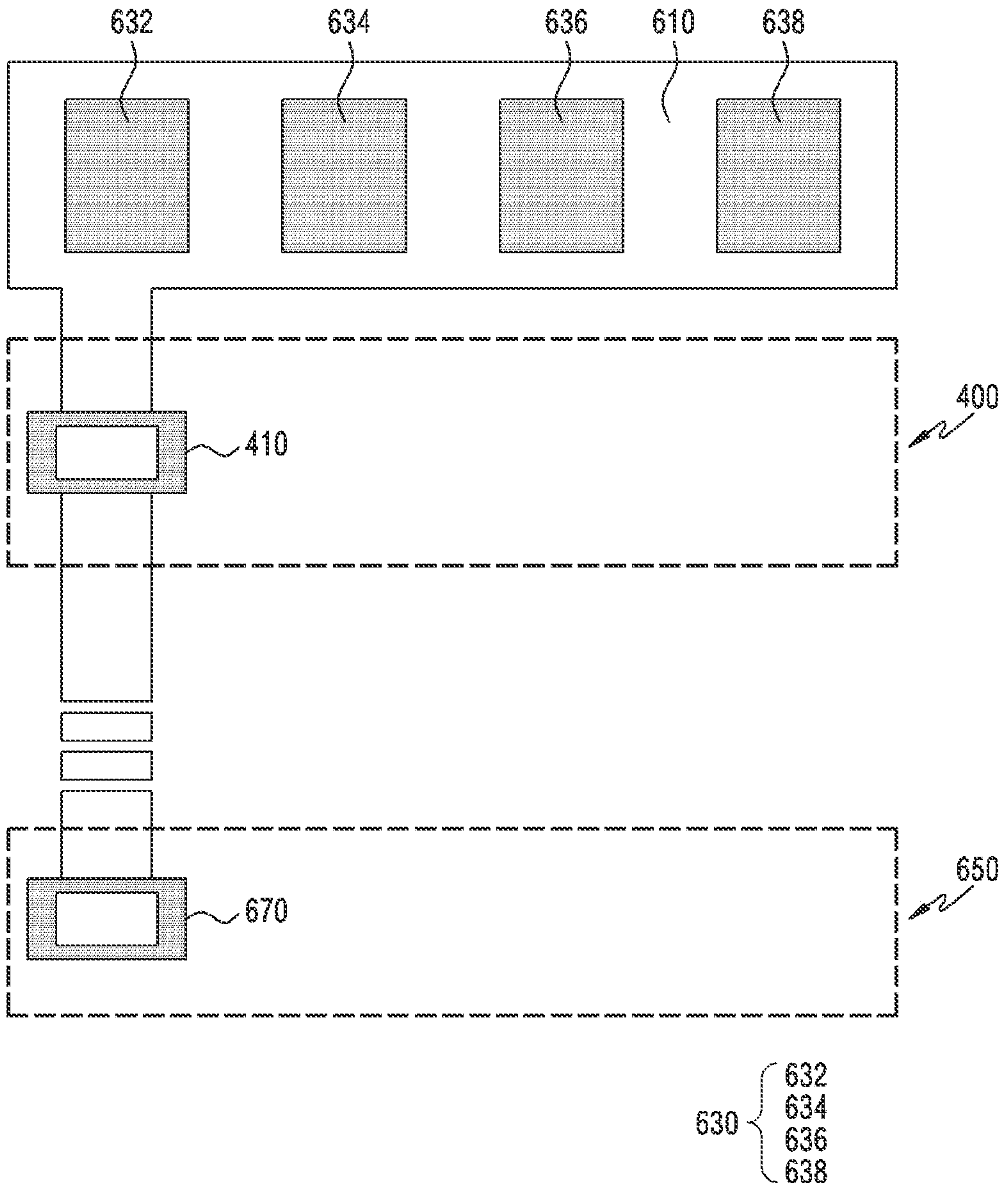
FIG. 6A illustrates a wireless communication circuit and an FPCB which are connected with an antenna module through a connector according to an embodiment.
Figure 6B:
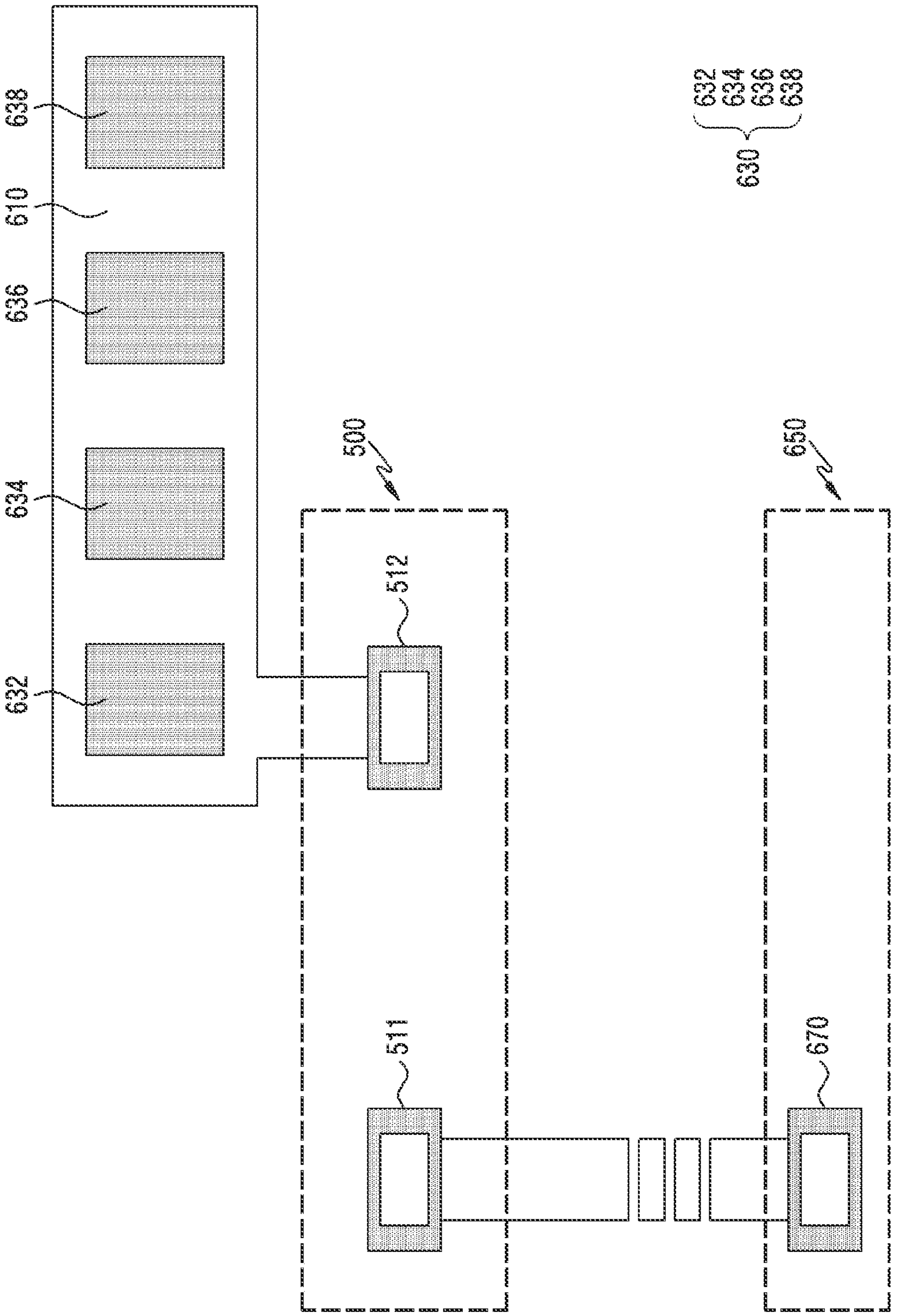
FIG. 6B illustrates a wireless communication circuit and an FPCB which are connected with an antenna module through a plurality of connectors according to an embodiment.

FIG. 6A illustrates a wireless communication circuit and an FPCB which are connected to an antenna module through a connector according to an embodiment. FIG. 6B illustrates a wireless communication circuit and an FPCB which are connected to an antenna module through a plurality of connectors according to an embodiment. A configuration that is substantially the same as the above-described configuration uses the same reference numeral and a redundant explanation thereof is omitted.

Referring to FIG. 6A, a connection structure may include a wireless communication circuit 650, a third connector 670 disposed on the wireless communication circuit 650, an FPCB 610 connected with the wireless communication circuit 650 through a connector 410, and an antenna module 400.

The wireless communication circuit 650 may include the third connector 670 therein. The third connector 670 may be electrically connected with the connector 410 on the antenna module 400.

The wireless communication circuit 650 may be electrically connected with the antenna module 400 through the connector 410 and the third connector 670. The wireless communication circuit 650 may be electrically connected with the antenna module 400 and the FPCB 610 through the connector 410 and the third connector 670. The wireless communication circuit 650 may be electrically connected with the FPCB 610 and a second array antenna 630 disposed on the FPCB 610 through the connector 410 disposed on the antenna module 400.

Referring to FIG. 6B, a connection structure may include a wireless communication circuit 650, a third connector 670 disposed inside the wireless communication circuit 650, an antenna module 500 including a first connector 511 and a second connector 512, and an FPCB 610 connected with the wireless communication circuit 650.

The wireless communication circuit 650 may include the third connector 670 therein. The third connector 670 may be electrically connected with a connector 410 on the antenna module 500.

The wireless communication circuit 650 may be electrically connected with the antenna module 500 through the first connector 511 and the third connector 670. The wireless communication circuit 650 may be electrically connected with the FPCB 610 and a second array antenna 630 disposed on the FPCB 610 through the first connector 511, the third connector 670, and the second connector 512. The first connector 511 and the second connector 512 may be connected through an RFIC disposed in the antenna module 500.

Referring to FIGS. 6A and 6B, the second array antenna 630 may include a first antenna element 632, a second antenna element 634, a third antenna element 636, and a fourth antenna element 638. Some of the above-described elements may be omitted or some configuration may be added. The second array antenna 630 may include a plurality of patch antenna arrangements (for example, the first antenna element 332, the second antenna element 334, the third antenna element 336, the fourth antenna element 338).

The wireless communication circuit 650 may transmit and/or receive a signal of a designated frequency band via a first array antenna 330 disposed in the antenna module 400 or 500, and via the second array antenna 630 disposed on the FPCB 610. For example, the wireless communication circuit 650 may transmit and receive a signal of about 3 GHz band via the first array antenna and may transmit and receive a signal of about 28 GHz band through the second array antenna 630, but is not limited thereto.

Figure 7:
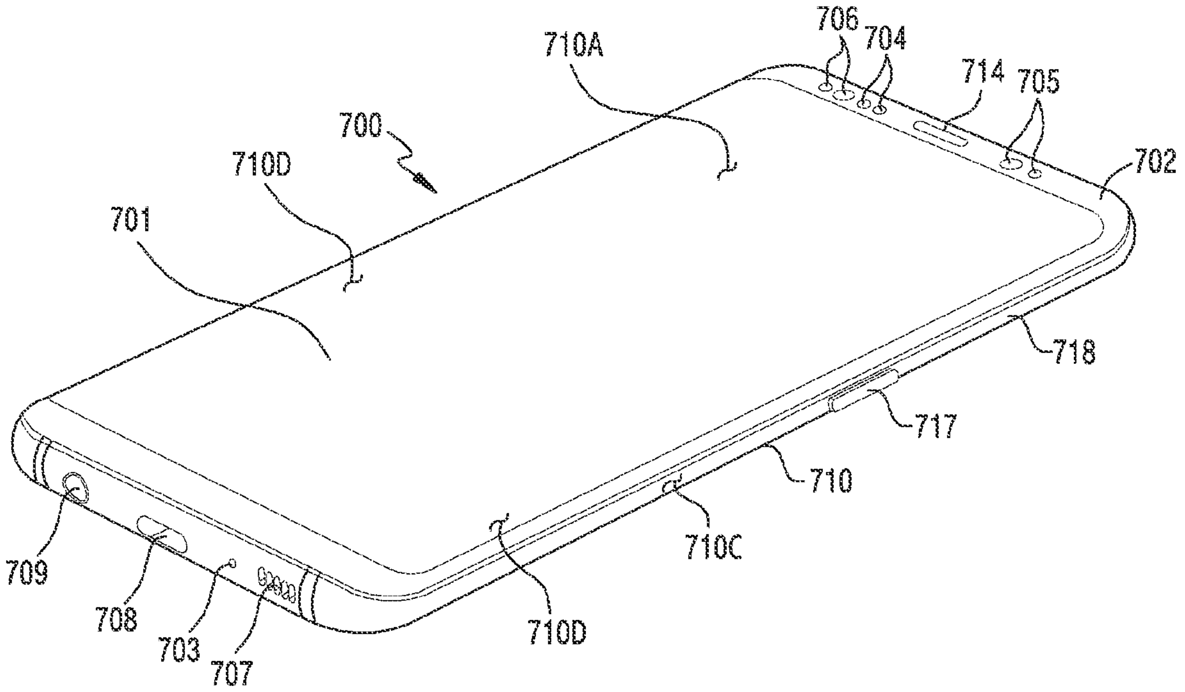
FIG. 7 is a perspective view of a front view of a mobile electronic device according to an embodiment.
Figure 8:
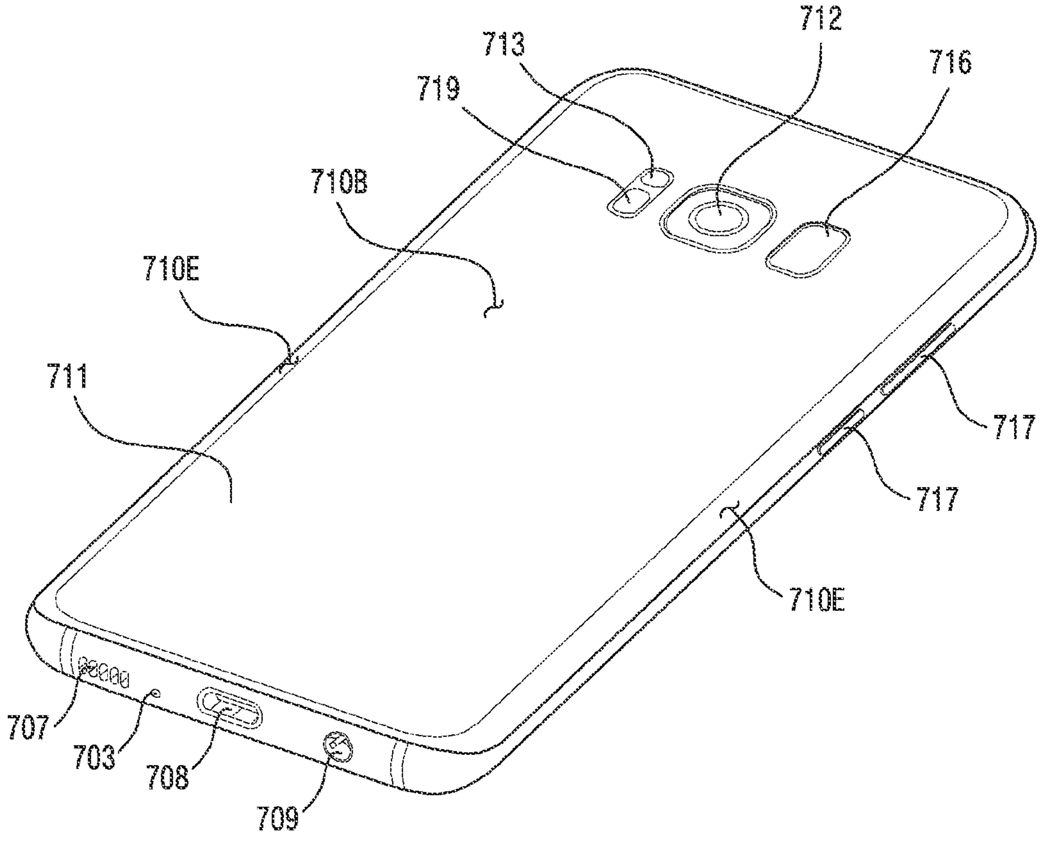
FIG. 8 is a perspective view of a rear view of the electronic device of FIG. 7.

FIG. 7 is a front perspective view illustrating an example mobile electronic device according to an embodiment. FIG. 8 is a rear perspective view illustrating an example mobile electronic device of FIG. 7 according to an embodiment.

Referring to FIGS. 7 and 8, an electronic device 700 may include a housing 710 including a first side (or a front side) 710A, a second side (or a rear side) 710B, and a lateral side (surface) 710C surrounding a space between the first side 700A and the second side 710B. The housing may also refer to part of the first side 710A, second side 710B, and third side 710C of FIG. 7. The first side 710A may be constructed of a front plate 702 (or a front cover) (e.g., a polymer plate or a glass plate having various coating layers) which is at least partially transparent.

The second side 710B may be constructed of a rear plate 711 (or a rear cover) which may be opaque. For example, the rear plate 711 may be constructed of coated or colored glass, ceramic, polymer, metallic materials (e.g., aluminum, stainless steel (STS), or magnesium), a combination of at least two of these materials, or the like.

The lateral side 710C (or a side member or side surface) may be constructed of a lateral bezel structure (or a lateral member) 718 bonded to the front plate 702 and the rear plate 711 and including metal and/or polymer. The rear plate 711 and the lateral bezel structure 718 may be constructed integrally and may include the same material (e.g., a metallic material such as aluminum).

In FIG. 7, the front plate 702 may include a first region 710D that bends from the first side 710A toward the rear plate and extends seamlessly, at both ends of a long edge of the front plate.

In FIG. 8, the rear plate 711 may include a second region 710E that extends from the second side 710B toward the front plate and extends seamlessly, at both ends of the long edge. The front plate or the rear plate may comprise only one of the first region or the second region. The front plate 702 does not include a first region and a second region and may include only a flat plane disposed in parallel with the second side 710B. As viewed from the side of the electronic device, the lateral bezel structure has a first thickness (or width) on the side where the first region or the second region is not included, and a second thickness that is thinner than the first thickness on the side including the first region or the second region.

The electronic device 700 may include at least one or more of a display 701, an input device 703, audio output devices 707 and 714, sensor modules 704 and 719, camera modules 705, 712, and 713, key input devices 715, 716 and 717, an indicator 706, and connector holes 708 and 709. The electronic device 700 may omit at least one of these components or may additionally include other components.

The display 701 may be exposed through some portions of the front plate 702. A portion of the display 701 may be exposed through the front plate 702 forming the first side 710A and the first region 710D of the lateral side 710C. For example, the display 701 may be disposed adjacent to or bonded to a touch sensing circuit, a pressure sensor capable of measuring touch strength (pressure), and/or a digitizer for detecting a stylus pen of a magnetic field type. In an example embodiment, at least portion of the sensor modules 704 and 719 and/or at least portion of the key input devices are disposed on the first portion 710D and/or the second portion 710E.

The audio modules 703, 707, and 714 may include a microphone hole 703 and speaker holes 707 and 714. A microphone for acquiring external sound may be disposed inside the microphone hole 703. A plurality of microphones may be disposed to sense a direction of the sound. The speaker holes 707 and 714 may include the external speaker hole 707 and the receiver hole 714 for a call. The speaker holes 707 and 714 and the microphone hole 703 may be implemented as a single hole, or a speaker (e.g., a piezo speaker) may be included without the speaker holes 707 and 714.

The input device 703 may include a microphone and may have a plurality of microphones disposed to sense a sound direction. The audio output device 707 and 714 may include the external speaker 707 and the communication receiver 714. The microphone 703, the speakers 707 and 714, and the connectors 708 and 709 may be exposed through at least one hole formed in the housing 710. The hole formed in the housing may be used in common for the microphone 703 and the speakers 707 and 714. The audio output device 707 and 714 may include the piezo speaker that is operated except for the holes formed in the housing 710.

The sensor modules 704, 716 and 719 may generate an electrical signal or data value corresponding to an internal operating state of the electronic device 700 or an external environmental state. The sensor modules 704, 716 and 719 may include the first sensor module 704 (e.g., a proximity sensor) and/or second sensor module (e.g., a fingerprint sensor) disposed to the first side 710A of the housing 710, and/or the third sensor module 719 (e.g., a heart rate monitor (HRM) sensor) disposed to the second side 710B of the housing 710 and/or the fourth sensor module 716 (e.g., fingerprint sensor). The fingerprint sensor may be disposed to a portion of the first side 710A (e.g., a home key button 715) or the second side 710B of the housing or below the display 701. The electronic device 700 may further include at least one of a sensor module, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, an illumination sensor 704, or the like.

The camera modules 705, 712, and 713 may include the first camera device 705 disposed to the first side 710A of the electronic device 700, the second camera device 712 disposed to the second side 710B, and/or the flash 713. The camera modules 705 and 712 may include one or more lenses, an image sensor, and/or an ISP. The flash 713 may include a light emitting diode (LED), a xenon lamp, or the like. Two or more lenses (wide angle and telephoto lenses) and image sensors may be disposed to one side of the electronic device 700.

The key input devices 715, 716, and 717 may include the home key button 715 disposed to the first side 710A of the housing 710, the touch pad 716 disposed around the home key button 715, and/or the side key button 717 disposed to the lateral side 710C of the housing 710. Alternatively, the electronic device 700 may not include some or all of the aforementioned key input devices 715, 716, and 717. The key input devices 715, 716, and 717, which are not included, may be implemented using a soft key displayed on the display 701 or a in a pressure sensor included in the display 701.

The indicator 706 may be disposed to the first side 710A of the housing 710. The indicator 706 may provide state information of the electronic device 700 in an optical form and may include an LED.

The connector holes 708 and 709 may include the first connector hole 708 capable of accommodating a USB connector for transmitting/receiving power and/or data of an external electronic device and/or the second connector hole or earphone jack 709 capable of accommodating a connector for transmitting/receiving an audio signal with respect to the external electronic device.

Figure 9:
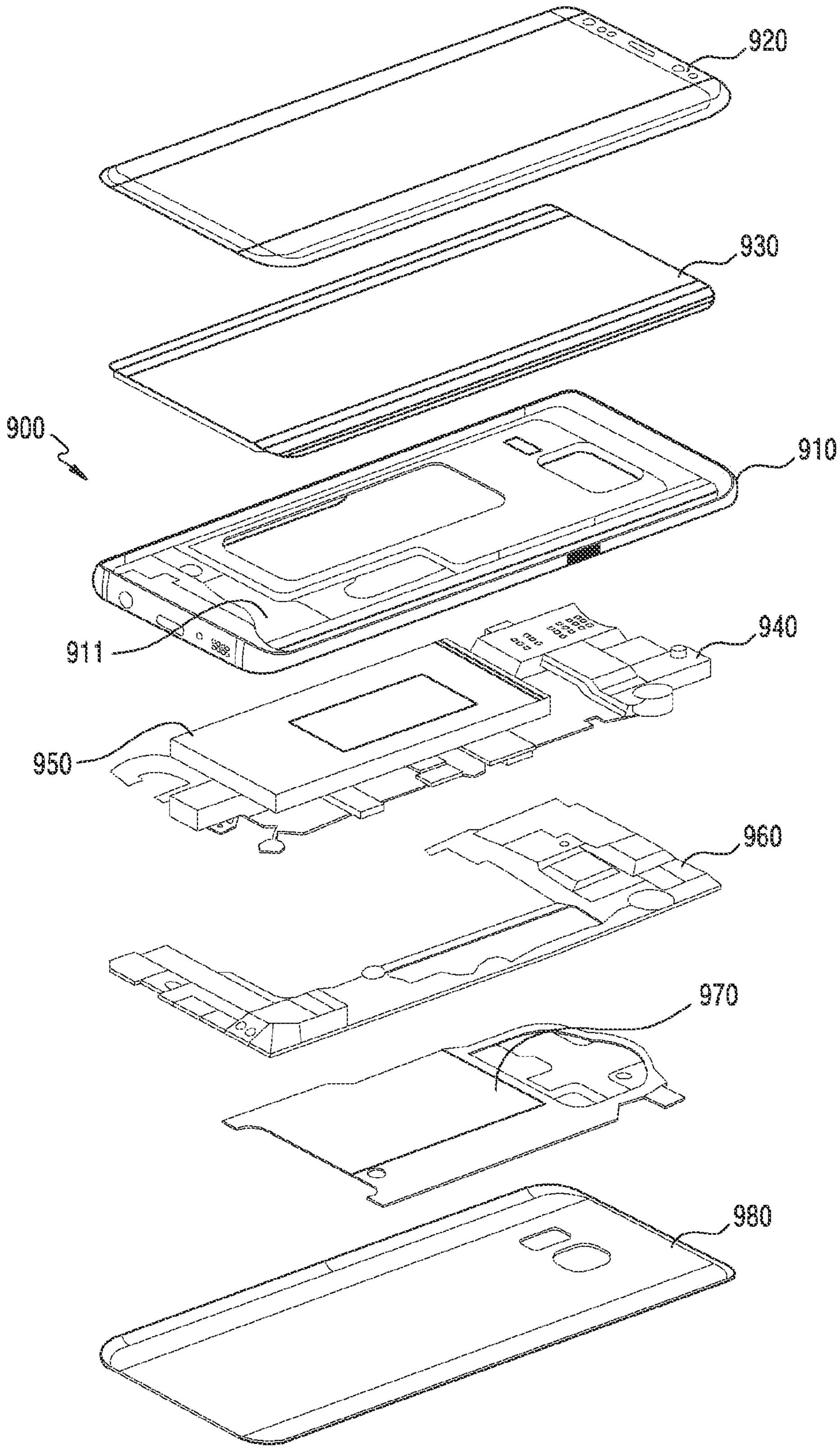
FIG. 9 is an exploded perspective view of the electronic device of FIG. 7.

FIG. 9 is an exploded perspective view illustrating the electronic device of FIG. 7 according to an embodiment.

Referring to FIG. 9, an electronic device may include a lateral bezel structure 910, a first support member 911 (e.g., a bracket), a front plate 920, a display 930, a PCB 940, a battery 950, a second support member 960 (e.g., a rear case), an antenna 970, and a rear plate 980. The electronic device 900 may omit at least the first support member 911 of these components, or may additionally include other components. At least one of the components of the electronic device 900 may be the same as or similar to at least one of the components of the electronic device 700 of FIG. 7 or FIG. 8, and redundant descriptions will not be repeated here.

The first support member 911 may be coupled with the lateral bezel structure 910 by being disposed inside the electronic device 900 or may be constructed integrally with respect to the lateral bezel structure 910. The first support member 911 may be constructed of a metal material and/or non-metal material (e.g., polymer), or the like. The display 930 may be bonded to one side of the first support member 911, and the PCB 940 may be bonded to the other side thereof. A processor, a memory, and/or an interface may be mounted on the PCB 940. The processor may include various processing circuitry, such as one or more of a central processing unit, an AP, a GPU, an ISP, a sensor hub processor, a CP, or the like.

The memory may include a volatile memory or a non-volatile memory.

The interface may include a high definition multimedia interface (HDMI), a universal serial bus (USB) interface, an SD card interface, an audio interface, or the like. For example, the interface may electrically or physically couple the electronic device 900 and the external electronic device, and may include a USB connector, an SD card/MMC connector, or an audio connector.

As a device for supplying power to at least one component of the electronic device 900, the battery 950 may include a non-rechargeable primary cell, a rechargeable secondary cell, a fuel cell, or the like. At least one portion of the battery 950 may be disposed on the same plane substantially with respect to the PCB 940. The battery 950 may be disposed integrally inside the electronic device 700 or may be detachably disposed with respect to the electronic device 900.

The antenna 970 may be disposed between the rear plate 980 and the battery 950. The antenna 970 may include a near field communication (NFC) antenna, a wireless charging antenna, a magnetic secure transmission (MST) antenna, or the like. The antenna 970 may perform short-range communication with the external electronic device or may wirelessly transmit/receive the power required for charging. An antenna structure may be constructed by at least part of the lateral bezel structure 910 and/or the first support member 911 or a combination thereof.

Figure 10A:
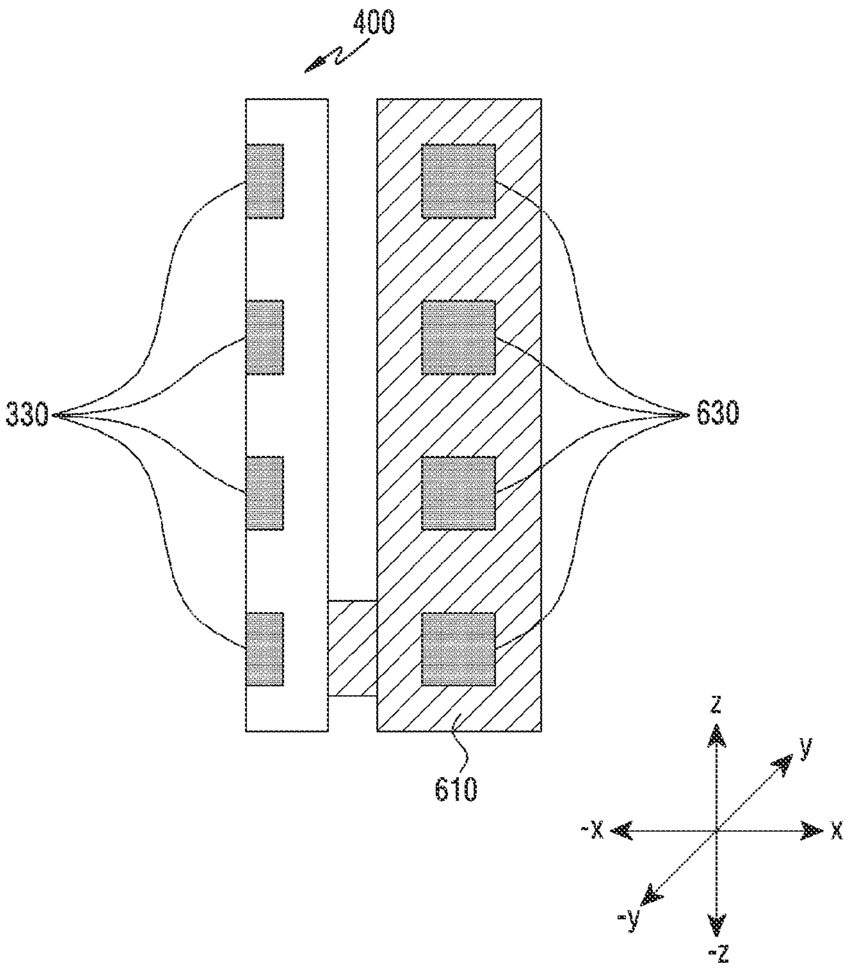
FIG. 10A illustrates an antenna module structure which radiates in a vertical direction according to an embodiment.
Figure 10B:
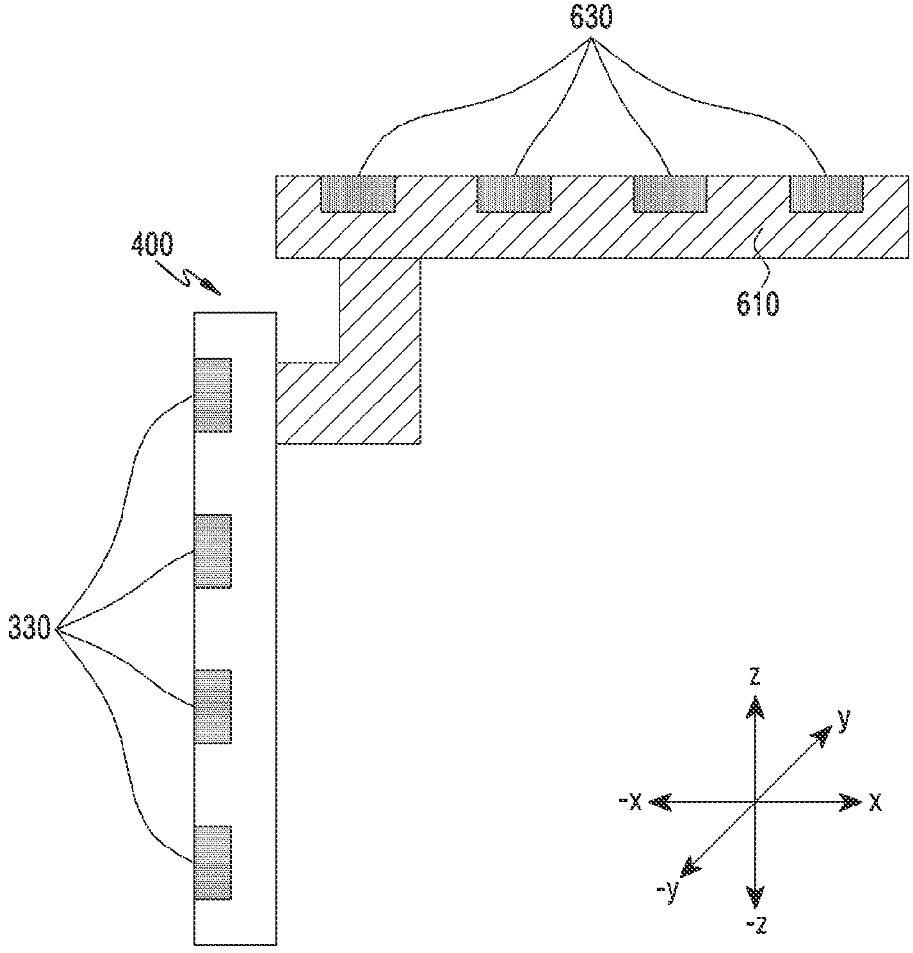
FIG. 10B illustrates an antenna module structure which radiates in a vertical direction according to an embodiment.
Figure 10C:
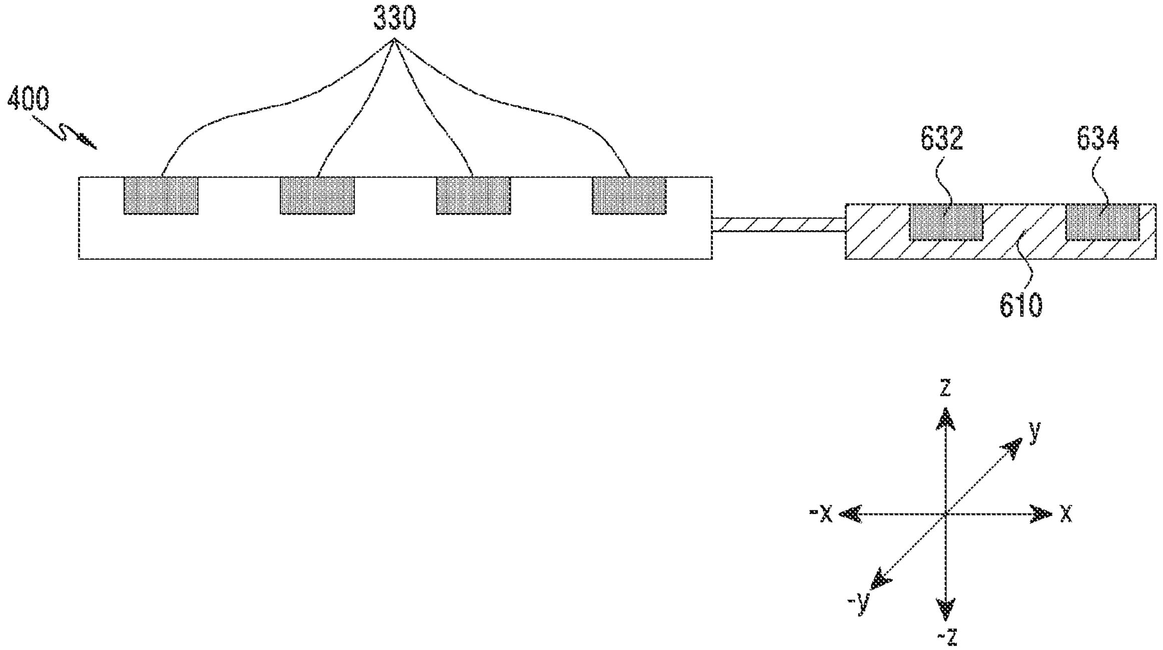
FIG. 10C illustrates an antenna module structure which radiates in the same direction according to an embodiment.

FIG. 10A illustrates an antenna module structure which radiates in a vertical direction according to an embodiment. FIG. 10B illustrates an antenna module structure which radiates in a vertical direction according to an embodiment. FIG. 10C illustrates an antenna module structure which radiates in the same direction according to an embodiment.

Referring to FIGS. 10A to 10C, an antenna module structure including an antenna module 400 and an FPCB 610 according to an embodiment may have various dispositions. A configuration that is substantially the same as the above-described configuration uses the same reference numeral, and a redundant explanation thereof is omitted.

The antenna module 400 and the FPCB 610 may be disposed orthogonally or in parallel. For example, the antenna module 400 may have a first array antenna 330 disposed to face in a −x direction, and the FPCB 610 may have a second array antenna 630 disposed to face in a −y direction. The antenna module 400 may have the first array antenna 330 disposed to face in the −x direction, and the FPCB 610 may have the second array antenna 630 disposed to face in a +z direction. The disposition of the antenna module 400 and the FPCB 610 is not limited to the above-described example and may include various dispositions.

A wireless communication circuit may radiate signals in designated directions through the first array antenna 330 disposed on the antenna module 400 and the second array antenna 630 disposed on the FPCB 610. The wireless communication circuit may radiate signals in the facing directions of the first array antenna 330 and the second array antenna 630. For example, the wireless communication circuit may radiate signals in the −x direction through the first array antenna 330 and may radiate signals in the −y direction through the second array antenna 630.

Alternatively, the wireless communication circuit may radiate signals in the −x direction through the first array antenna 330 and may radiate signals in the +z direction through the second array antenna 630. The wireless communication circuit may radiate signals in the +z direction through the first array antenna 330 and may radiate signals in the +z direction through the second array antenna 630, but the directions of radiating signals are not limited to the above-described examples, and may have various directions according to dispositions of the antenna module 400 and the FPCB 610.

Figure 11A:
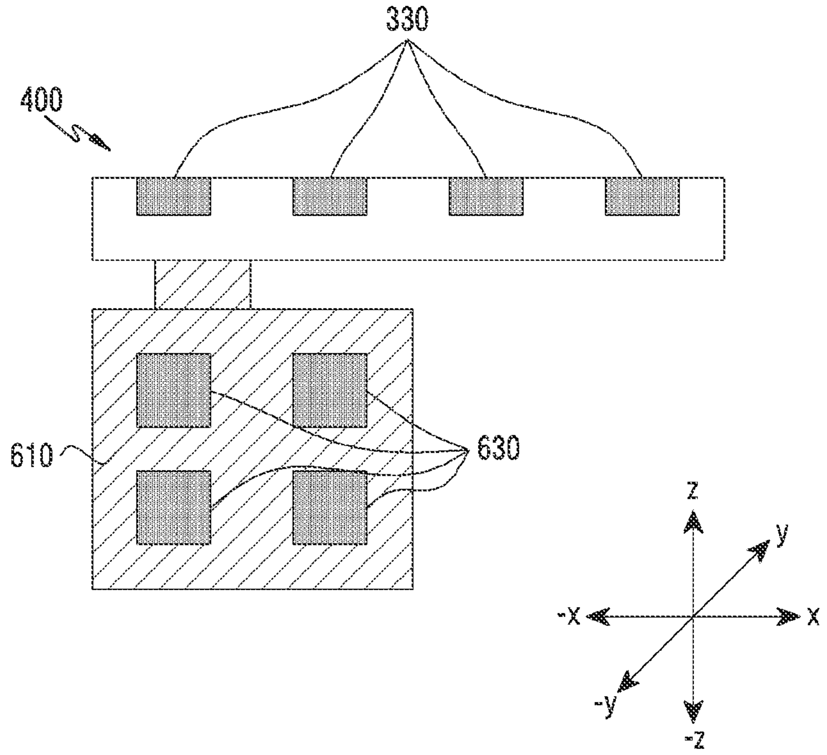
FIG. 11A illustrates an FPCB including an array antenna of a 2×2 arrangement, and an antenna module according to an embodiment.
Figure 11B:
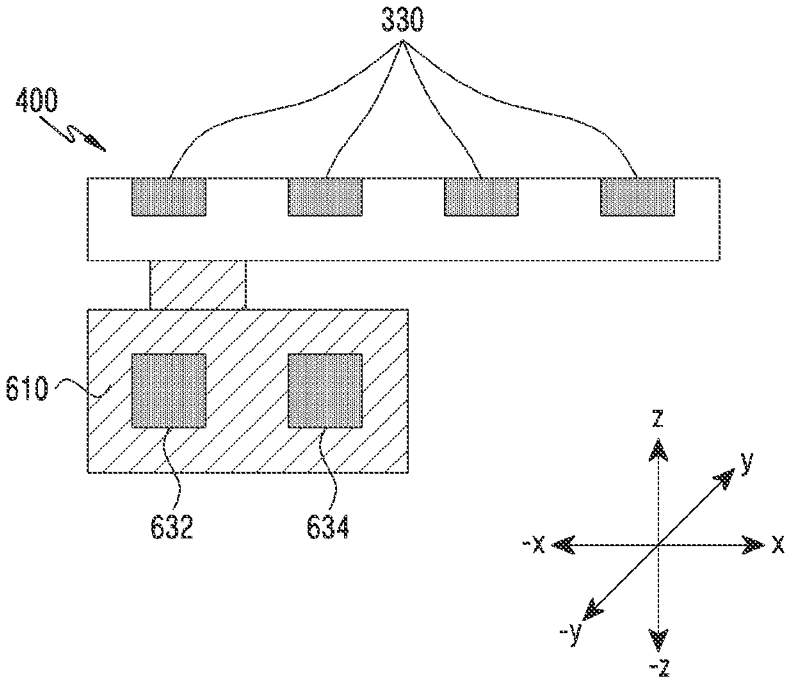
FIG. 11B illustrates an FPCB including an array antenna of a 1×2 arrangement, and an antenna module according to an embodiment.

FIG. 11A illustrates an FPCB including an array antenna of a 2×2 arrangement, and an antenna module according to an embodiment. FIG. 11B illustrates an FPCB including an array antenna of a 1×2 arrangement, and an antenna module according to an embodiment.

Referring to FIGS. 11A and 11B, the first array antenna 330 and the second array antenna 630 may be arranged on the antenna module 400 and the FPCB 610, respectively, in various arrangements. A configuration which is substantially the same as the above-described configuration uses the same reference numeral, and a redundant explanation thereof is omitted.

The first array antenna 330 and the second array antenna 630 may include a plurality of antenna elements. For example, the second array antenna 630 may include a first antenna element to a fourth antenna element (for example, 632, 634, 636, 638 of FIG. 6A). Some elements (for example, 636, 638 of FIG. 6A) of the plurality of antenna elements described above may be omitted, and some configuration may be added.

Referring to FIG. 11A, the plurality of antenna elements of the second array antenna 630 may be arranged on the FPCB 610 with the 2×2 arrangement. Referring to FIG. 11B, the first antenna element 632 and the second antenna element 634 constituting the second array antenna 630 may be arranged with the 1×2 arrangement.

The arrangements of the first array antenna 330 and the second array antenna 630 are not limited to the above-described arrangements and may include various arrangements according to the number of antenna elements constituting the first array antenna 330 and the second array antenna 630, and dispositions of the antenna elements.

Figure 12A:
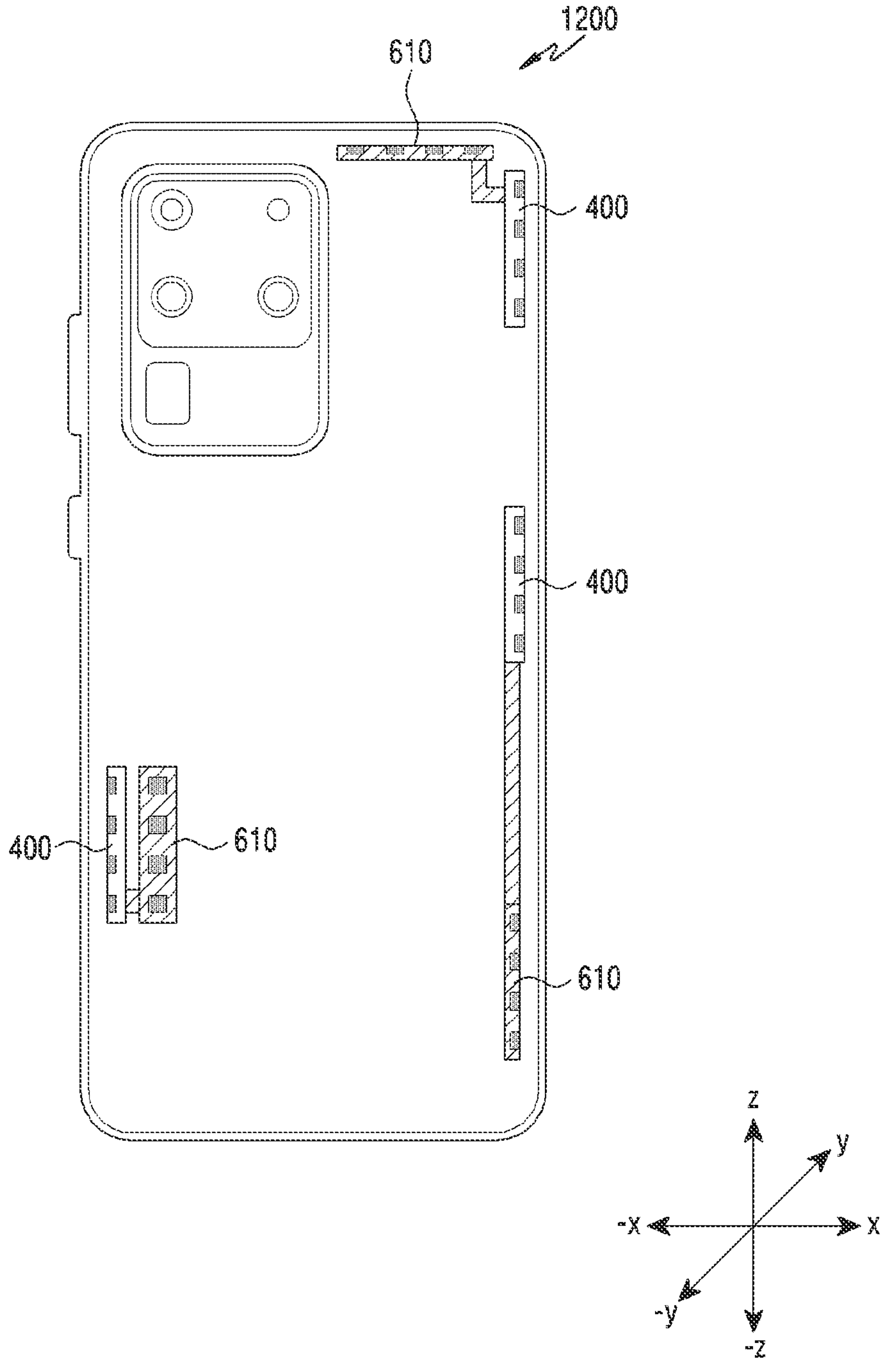
FIG. 12A illustrates an antenna module structure disposed in an electronic device according to an embodiment.
Figure 12B:
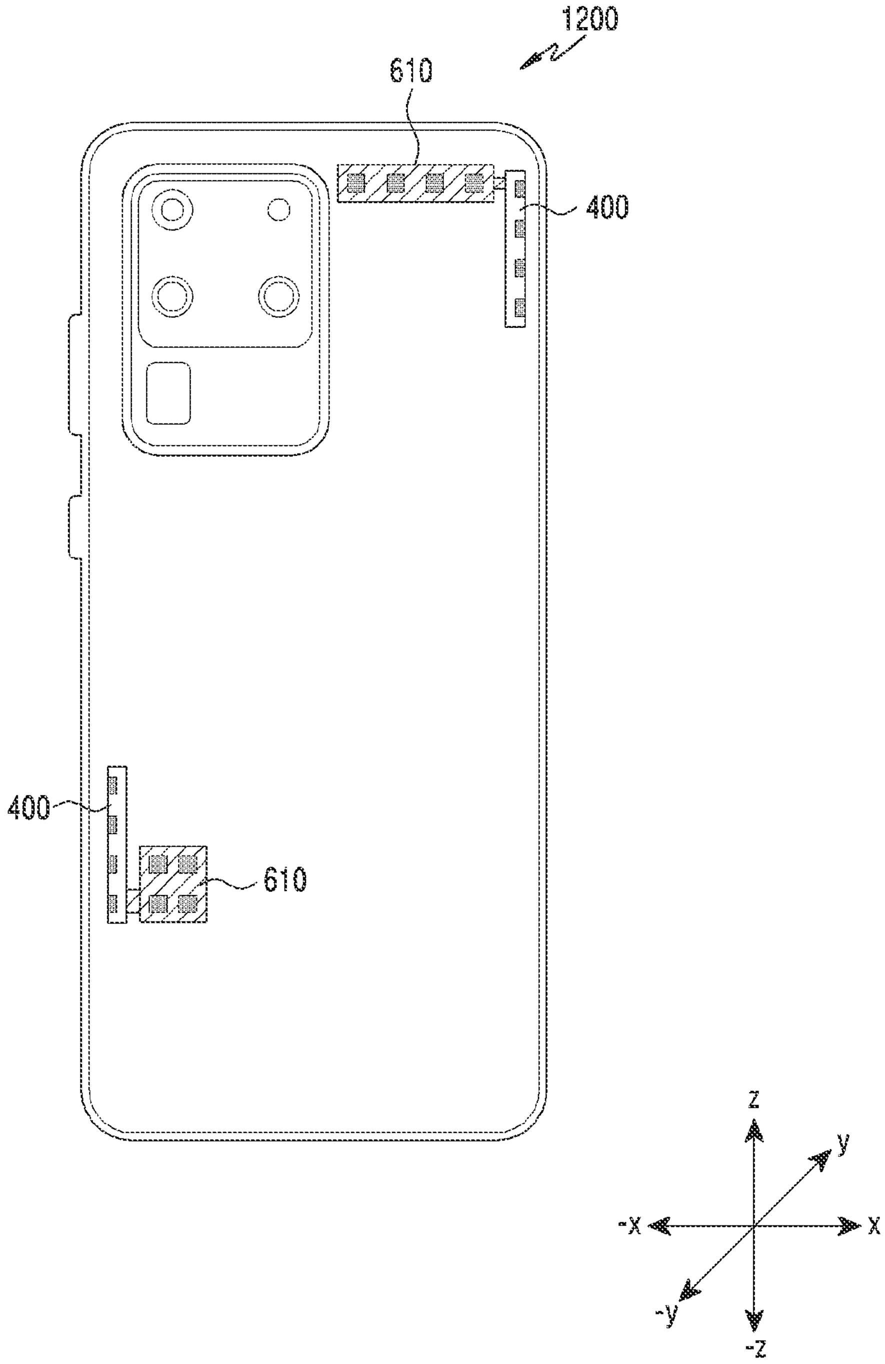
FIG. 12B illustrates an antenna module structure disposed in an electronic device according to an embodiment.

FIG. 12A illustrates an antenna module structure disposed in an electronic device according to an embodiment. FIG. 12B illustrates an antenna module structure disposed in an electronic device according to an embodiment.

Referring to FIGS. 12A and 12B, an antenna module 400 and an FPCB 610 may be disposed inside the electronic device 1200 in various manners.

The electronic device 1200 may include a housing 710 forming an exterior thereof. The antenna module 400 and the FPCB 610 may be disposed inside the housing forming the exterior of the electronic device 1200. The antenna module 400 and the FPCB 610 may be disposed adjacent to a side surface 710C inside the housing. For example, the antenna module 400 may have a first array antenna 330 disposed to face a side surface (for example, the −x direction) of the housing, and the FPCB 610 may have a second array antenna 630 disposed to face a rear surface (for example, the second surface 710B) (for example, the −y direction) of the housing. The antenna module 400 and the FPCB 610 may have the first array antenna and the second array antenna disposed to face a side surface of the housing, respectively. The disposition of the antenna module 400 and the FPCB 610 is not limited to the above-described examples and may include various dispositions.

Referring to FIGS. 11A, 11B, and 12B, the antenna module 400 and the FPCB 610 may have the first array antenna 330 or the second array antenna 630 disposed thereon with various arrangements, respectively. For example, the FPCB 610 may have the second array antenna 630 disposed to have the 1×2 arrangement but is not limited thereto.

Figure 13A:
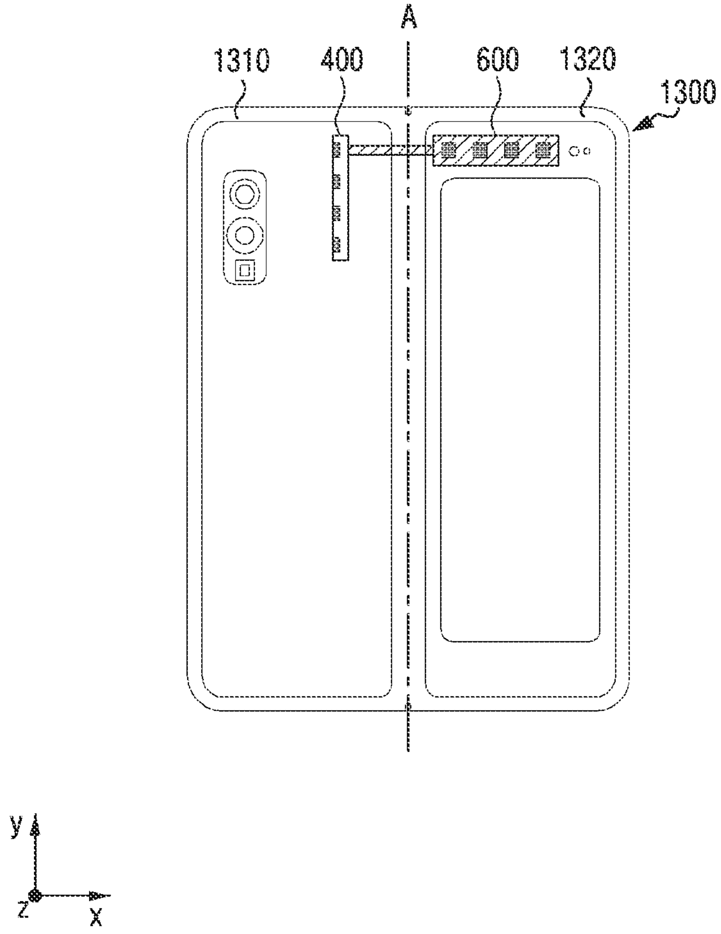
FIG. 13A illustrates an antenna module structure disposed in an electronic device which is in a flat state according to an embodiment.
Figure 13B:
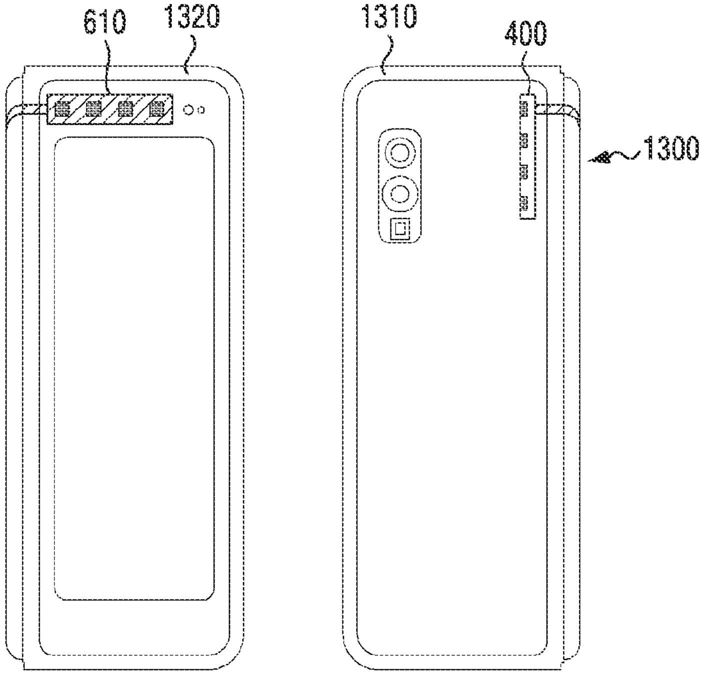
FIG. 13B illustrates an antenna module structure disposed in the electronic device which is in a folding state according to an embodiment.

FIG. 13A illustrates an antenna module structure disposed in an electronic device which is in a flat state according to an embodiment. FIG. 13B illustrates the antenna module structure disposed in the electronic device which is in a folding state according to an embodiment.

Referring to FIGS. 13A and 13B, the electronic device 100 may include one pair of housing structures 1310, 1320 which are coupled to each other to be pivotable through a hinge structure to be folded with respect to each other. The one pair of housing structures 1310, 1320 may include a first housing structure 1310 and a second housing structure 1320. The one pair of housing structures 1310, 1320 of the electronic device 1300 is not limited to the shape and coupling illustrated in FIGS. 13A and 13B, and may be implemented by a combination and/or coupling of other shapes or components. The first housing structure 1310 and the second housing structure 1320 may be disposed on both sides with reference to a folding axis (A axis) and may have a substantially symmetrical shape with respect to the folding axis (A axis). The first housing structure 1310 and the second housing structure 1320 may have an angle or distance formed therebetween, which varies according to whether the electronic device 1300 is in a flat state or a closing state, a folding state, or an intermediate state.

The electronic device 1300 may include an antenna module 400 and an FPCB 610 disposed therein with reference to a folding axis (A axis). For example, the antenna module 400 may be disposed inside the first housing structure 1310, and the FPCB 610 may be connected to the antenna module 400 and may be disposed inside the second housing structure 1320. The antenna module structure 400 or 610 may have an angle or a distance formed therebetween, which varies according to whether the electronic device 1300 is in a folding state or a flat state. For example, when the electronic device 30 is in the folding state, the antenna module structure 400 and 610 may be bent, and, when the electronic device 1300 is in the flat state, the antenna module structure 400 and 610 may be unbent.

Figure 14A:
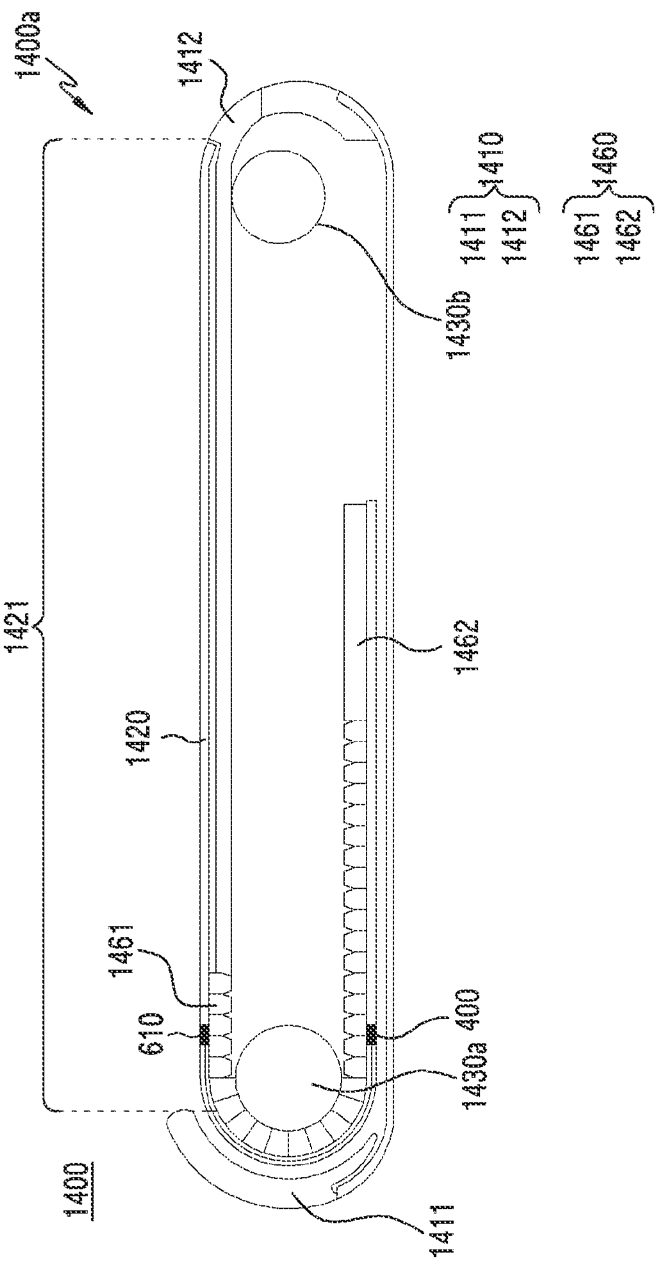
FIG. 14A is a cross-sectional view of an electronic device in a first state that includes a plurality of joint structures according to an embodiment.
Figure 14B:
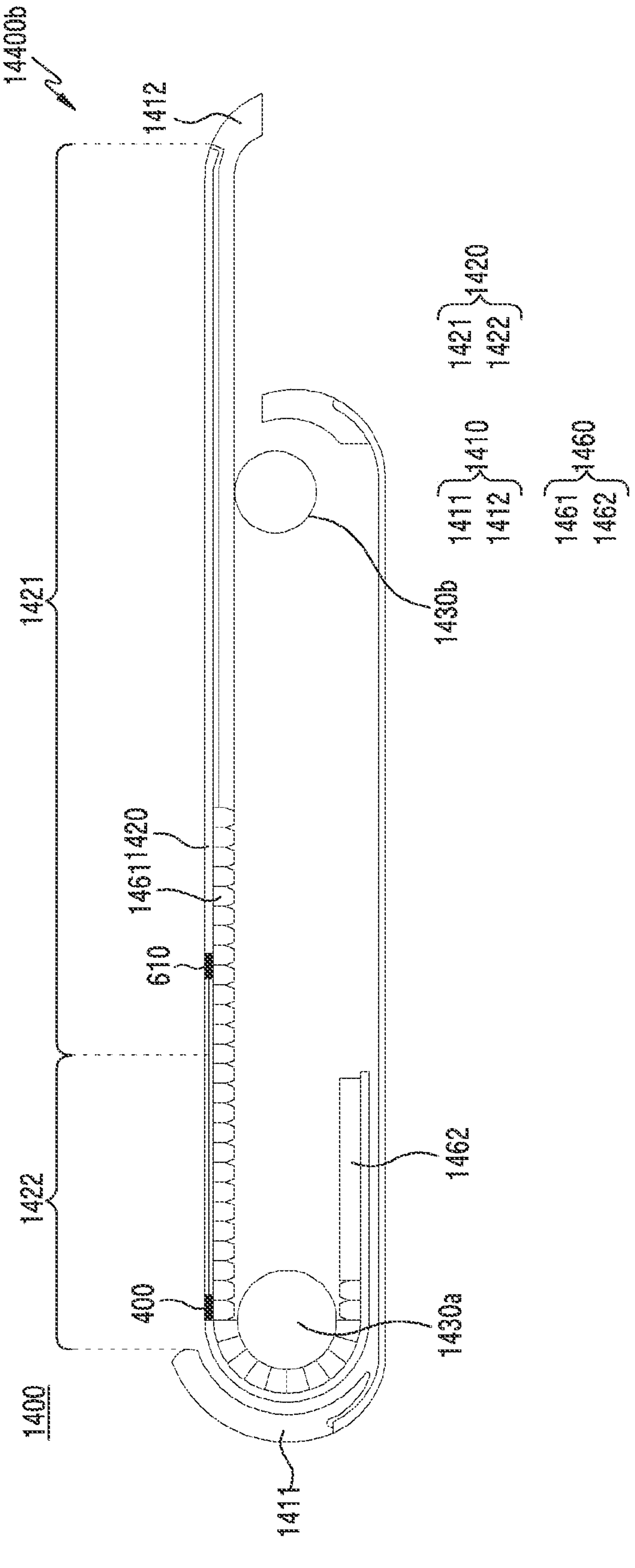
FIG. 14B is a cross-sectional view of the electronic device in a second state that includes the plurality of joint structures according to an embodiment.

FIG. 14A is a cross-sectional view of an electronic device in a first state that includes a plurality of joint structures according to an embodiment. FIG. 14B is a cross-sectional view of the electronic device in a second state that includes the plurality of joint structures according to an embodiment.

Referring to FIGS. 14A and 14B, the electronic device 1400 may include a display 1420, a first housing 1411, a second housing 1412, a roller unit 1430, a rolling rail 1460, an antenna module 400, and an FPCB 610.

The first housing 1411 may form at least part of a side surface and/or a rear surface of the electronic device 1400. The second housing 1412 may form at least part of a front surface and/or the side surface of the electronic device 1400. The display 1420 may be coupled with at least part of the second housing 1412.

Some areas of the display 1420 may be disposed to overlap the second housing 1412. For example, at least some areas of one surface of the display 1420 may be disposed in contact with at least some areas of the front surface of the second housing 1412, and the other surface of the display 1420 may be disposed to be exposed to the outside.

The rolling rail 1460 may include a plurality of joint structures 1461 and a support plate 1462. Some areas of the plurality of joint structures 1461 may have their shape deformed in the process of a first state 1400*a* or a second state 1400*b* of the electronic device 1400 being switched. For example, some areas of the plurality of joint structures 1461 may be bent or unbent to have a designated curvature in the process of the electronic device 1400 being switched from the first state 1400*a* to the second state 1400*b* or from the second state 1400*b* to the first state 1400*a*. The second housing 1412 may be fixed or coupled to one end of the plurality of joint structures 1461, and part of a first portion 1421 of the display 1420 may be disposed on an upper end of the second housing 1412. The support plate 1462 may be fixed or coupled to one end of the plurality of joint structures 1461.

The electronic device 1400 may include a first roller 1430*a* and/or a second roller 1430*b* which is spaced apart from the first roller 1430*a*. For example, the second housing 1412 of the display 1410 may be coupled to one end of the second roller 1430*b*. Accordingly, the above-described second roller 1430*b* may serve to maintain flatness of the display 1420 in the process of the electronic device 1400 being switched from the second state 1400*b* to the first state 1400*a* or from the first state 1400*a* to the second state 1400*b*. The first roller 1430*a* may include an element, such as a rotation shaft or a gear, for providing a rotary. Additionally, the first roller 130*a* may further include a motor connected with at least the rotation shaft of the elements.

The first roller 1430*a* may be in contact with the plurality of joint structures of the rolling rail 1460, and the rolling rail 1460 may be moved within a designated range by rotation of the first roller 1430*a*. For example, when the first roller 1430*a* is rotated in the clockwise direction in the process of the electronic device 1400 being switched from the first state 1400*a* to the second state 1400*b*, some areas of the plurality of joint structures 1461 that are bent may be unbent and the rolling rail 1460 may move in a first direction away from the first roller 1430*a*. In another example, when the first roller 1430*a* is rotated in the counter-clockwise direction in the process of the electronic device 1400 being switched from the second state 1400*b* to the first state 1400*a*, some areas of the plurality of joint structures 1461 that are unbent may be bent and the rolling rail 1460 may move in a second direction opposite to the first direction. As some areas of the plurality of joint structures 1461 have their shapes deformed in the process of switching the state of the electronic device 1400, the shape of a second portion 1422 of the display 1420 supported by the plurality of joint structures 1461 may be deformed to correspond to the shape of the plurality of joint structures 1461.

The display 1420 may be disposed on an outer circumference of the rolling rail 1460, and the above-described display 1420 may be moved along with the rolling rail 1460 by the rotation of the first roller 1430*a*. The display 1420 may include the first portion 1421 and/or the second portion 1422 which has its shape deformed according to a state of the electronic device 1400.

The first portion 1421 of the display 1420 may be positioned on upper ends of the second housing 1412 of the rolling rail 1460 and/or some areas of the plurality of joint structures 1461 and may be supported by the second housing 1412 and/or the plurality of joint structures 1461. The first portion 1421 of the display 1420 may be exposed to the outside of the electronic device 1400 regardless of the state of the electronic device 1400.

The second portion 1422 of the display 1420 may be positioned on upper ends of some areas of the plurality of joint structures 1461 of the rolling rail 1460 and may be supported by the plurality of joint structures 1461. The second portion 1422 of the display 1420 may be selectively exposed to the outside of the electronic device 1400 according to a state of the electronic device 1400.

When the electronic device 1400 is in the first state 1400*a*, the second portion 1422 of the display 1420 may be rolled with the plurality of joint structures 1461 and may be accommodated in an inner space of the electronic device 1400, and as a result, the second portion 1422 may not be exposed to the outside of the electronic device 1400. When the electronic device 1400 is switched from the first state 1400*a* to the second state 1400*b*, an area of the second portion 1422 of the display 1420 that is adjacent to the first portion 1421 may be drawn out from the inside of the electronic device 1400. As some areas of the second portion 1422 adjacent to the first portion 1421 are drawn out from the inside of the electronic device 1400, a surface area of the display 1420 exposed to the outside of the electronic device 1400 may be expanded. When the electronic device 1400 is switched from the second state 1400*b* to the first state 1400*a*, an area of the second portion 1422 exposed to the outside of the electronic device 300 that is adjacent to the support plate 1462 may be retracted into the electronic device 1400. As some areas of the second portion 1422 that are adjacent to the support plate 1462 are retracted into the electronic device 1400, the surface area of the display 1420 exposed to the outside of the electronic device 1400 may be reduced.

The antenna module 400 and the FPCB 610 may be disposed inside the electronic device 1400 adjacent to the first roller 1430*a* or the plurality of joint structures 1461. A connection between the antenna module 400 and the FPCB 610 may be bent or unbent according to switching of the state of the electronic device 1400. When the electronic device 1400 is in the first state 1400*a*, a portion of the FPCB 610 that is connected to the antenna module 400 may be disposed in a bent state. When the electronic device 1400 is in the second state 1400*b*, a portion of the FPCB 610 that is connected to the antenna module 400 may be disposed in an unbent state.

According to an embodiment, an electronic device may include an antenna module including a first array antenna disposed on a first surface, an RFIC disposed on a second surface which is parallel to the first surface, and a connector, a wireless communication circuit electrically connected with the antenna module through the connector, and an FPCB electrically connected with the antenna module through the connector, the FPCB including a second array antenna. The wireless communication circuit may transmit and receive a first signal via the first array antenna and may transmit and receive a second signal which is distinct from the first signal via the second array antenna.

The electronic device may include a PMIC disposed on the second surface, and the PMIC may be electrically connected with the connector and the RFIC.

The first array antenna and the second array antenna may include a plurality of patch antenna arrangements.

The first signal and the second signal may include a signal of a frequency band of 28 GHz to 300 GHz.

The RFIC may receive an IF signal from the wireless communication circuit via the connector, may modulate the IF signal to an RF signal, and may transmit the RF signal to the first array antenna and the connector.

The IF signal may include a signal of a frequency band of 10 GHz, and the RF signal may include a signal of a frequency band of 28 GHz or 30 GHz.

The RFIC may include a reception terminal, a first terminal group and a second terminal group, and the RFIC may receive the IF signal from the connector via the reception terminal, may transmit a first RF signal to the first array antenna via the first terminal group, and may transmit a second RF signal to the connector via the second terminal group.

The connector may include a third terminal group corresponding to the second terminal group, and a fourth terminal group connected with the second array antenna.

According to an embodiment, an antenna module may include a first array antenna disposed on a first surface, a connector disposed on a second surface which is parallel to the first surface, and an RFIC electrically connected with the connector and the first array antenna, and the RFIC may be configured to modulate an IF signal received from the connector into an RF signal, and to transmit the RF signal to the first array antenna and the connector.

The antenna module may include a PMIC disposed on the second surface, and the PMIC may be electrically connected with the connector and the RFIC.

The connector may include a plurality of terminals electrically connected with an FPCB including a second array antenna.

The first array antenna may include a plurality of patch antenna arrangements.

The IF signal may include a signal of a frequency band of 10 GHz, and the RF signal may include a signal of a frequency band of 28 GHz or 300 GHz.

The RFIC may include a reception terminal, a first terminal group, and a second terminal group, and the RFIC may be configured to receive the IF signal from the connector via the reception terminal, transmit the RF signal to the first array antenna via the first terminal group, and transmit the RF signal to the connector via the second terminal group.

The connector may include a third terminal group corresponding to the second terminal group, and a fourth terminal group connected with the second array antenna.

According to an embodiment, an electronic device may include an antenna module including a first array antenna, an RFIC, a first connector and a second connector, a wireless communication circuit electrically connected with the antenna module through the first connector, and an FPCB electrically connected with the antenna module through the second connector, the FPCB including a second array antenna, and the wireless communication circuit may transmit and receive a first signal via the first array antenna, and may transmit and receive a second signal which is distinct from the first signal via the second array antenna.

The RFIC may include a reception terminal, a first terminal group, and a second terminal group, and the RFIC may receive an IF signal from the first connector via the reception terminal, may transmit a first RF signal to the first array antenna via the first terminal group, and may transmit a second RF signal to the second connector via the second terminal group.

The first connector may include a transmission terminal corresponding to the reception terminal, and the second connector may include a third terminal group corresponding to the second terminal group, and a fourth terminal group connected with the second array antenna.

The first array antenna and the second array antenna may include a plurality of patch antenna arrangements.

The electronic device may include a PMIC which may be electrically connected with the connector and the RFIC.

As used herein, the term "module" may include a unit implemented in hardware, software, or firmware, and may interchangeably be used with other terms such as "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as a program including one or more instructions that are stored in an internal memory or external memory that is readable by the electronic device. For example, a processor 120 of the electronic device may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" indicates that the storage medium is a tangible device and does not include a signal, but this term does not differentiate between where data is semi-permanently stored in the storage medium and where the data is temporarily stored in the storage medium.

A method herein may be included and provided in a computer program product that may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities, and some of the multiple entities may be separately disposed in different components. One or more of the above-described components may be omitted, or one or more other components may be added. Alternatively, or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:

an antenna module comprising a first array antenna disposed on a printed circuit board, a radio frequency integrated circuit (RFIC) disposed on the printed circuit board, and a connector;

a wireless communication circuit electrically connected with the antenna module through the connector; and a flexible printed circuit board (FPCB) electrically connected with the antenna module through the connector, the FPCB comprising a second array antenna, wherein the wireless communication circuit is configured to transmit and receive a first signal via the first array antenna, and to transmit and receive a second signal which is distinct from the first signal via the second array antenna.

2. The electronic device of claim 1, further comprising a power management integrated circuit (PMIC) disposed on the printed circuit board, wherein the PMIC is electrically connected with the connector and the RFIC.

3. The electronic device of claim 1, wherein the first array antenna and the second array antenna comprise a plurality of patch antenna arrangements.

4. The electronic device of claim 1, wherein the first signal and the second signal comprise a signal of a frequency band of 28 gigahertz (GHz) to 300 GHz.

5. The electronic device of claim 1, wherein the RFIC is configured to:

receive an intermediate frequency (IF) signal from the wireless communication circuit via the connector;

modulate the IF signal to a radio frequency (RF) signal; and transmit the RF signal to the first array antenna and the connector.

6. The electronic device of claim 5,
wherein the IF signal comprises a frequency band of 10 gigahertz (GHz), and
wherein the RF signal comprises a frequency band of 28 GHz or 30 GHz.
7. The electronic device of claim 5,
wherein the RFIC comprises a reception terminal, a first terminal group and a second terminal group, and
wherein the RFIC is configured to:
receive the IF signal from the connector via the reception terminal;
transmit a first RF signal to the first array antenna via the first terminal group; and
transmit a second RF signal to the connector via the second terminal group.
8. The electronic device of claim 7,
wherein the connector comprises a third terminal group corresponding to the second terminal group and a fourth terminal group connected with the second array antenna.
9. An antenna module comprising:
a first array antenna disposed on a printed circuit board;
a connector disposed on the printed circuit board; and
a radio frequency integrated circuit (RFIC) electrically connected with the connector and the first array antenna,
wherein the RFIC is configured to modulate an intermediate frequency (IF) signal received from the connector into a radio frequency (RF) signal, and to transmit the RF signal to the first array antenna and the connector, and
wherein the connector is configured to electrically connect with a flexible printed circuit board (FPCB) comprising a second array antenna.
10. The antenna module of claim 9, further comprising a power management integrated circuit (PMIC) disposed on the printed circuit board,
wherein the PMIC is electrically connected with the connector and the RFIC.
11. The antenna module of claim 9,
wherein the first array antenna comprises a plurality of patch antenna arrangements.
12. The antenna module of claim 9,
wherein the IF signal comprises a frequency band of 10 gigahertz (GHz), and
wherein the RF signal comprises a frequency band of 28 GHz or 300 GHz.
13. The antenna module of claim 9,
wherein the RFIC comprises a reception terminal, a first terminal group, and a second terminal group, and
wherein the RFIC is configured to:
receive the IF signal from the connector via the reception terminal;
transmit the RF signal to the first array antenna via the first terminal group; and
transmit the RF signal to the connector via the second terminal group.
14. The antenna module of claim 13,
wherein the connector comprises a third terminal group corresponding to the second terminal group, and a fourth terminal group connected with the second array antenna.
15. An electronic device comprising:
an antenna module comprising a first array antenna, a radio frequency integrated circuit (RFIC), a first connector and a second connector;
a wireless communication circuit electrically connected with the antenna module through the first connector; and
a flexible printed circuit board (FPCB) electrically connected with the antenna module through the second connector, the FPCB comprising a second array antenna,
wherein the wireless communication circuit is configured to transmit and receive a first signal via the first array antenna, and to transmit and receive a second signal which is distinct from the first signal via the second array antenna.
16. The electronic device of claim 15,
wherein the RFIC comprises a reception terminal, a first terminal group, and a second terminal group, and
wherein the RFIC is configured to:
receive an IF signal from the first connector via the reception terminal;
transmit a first RF signal to the first array antenna via the first terminal group; and
transmit a second RF signal to the second connector via the second terminal group.
17. The electronic device of claim 16,
wherein the first connector comprises a transmission terminal corresponding to the reception terminal, and
wherein the second connector comprises a third terminal group corresponding to the second terminal group, and a fourth terminal group connected with the second array antenna.
18. The electronic device of claim 15,
wherein the first array antenna and the second array antenna comprise a plurality of patch antenna arrangements.
19. The electronic device of claim 15,
wherein the electronic device comprises a power management integrated circuit (PMIC), and
wherein the PMIC is electrically connected with the connector and the RFIC.

* * * * *